US010128964B2

(12) United States Patent
Wiley

(10) Patent No.: US 10,128,964 B2
(45) Date of Patent: Nov. 13, 2018

(54) MULTIPHASE PREAMBLE DATA SEQUENCES FOR RECEIVER CALIBRATION AND MODE DATA SIGNALING

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 22 days.

(21) Appl. No.: 15/454,608

(22) Filed: Mar. 9, 2017

(65) Prior Publication Data
US 2017/0264379 A1 Sep. 14, 2017

Related U.S. Application Data

(60) Provisional application No. 62/306,572, filed on Mar. 10, 2016.

(51) Int. Cl.
*H04B 17/21* (2015.01)
*H04L 25/03* (2006.01)
*H04L 7/10* (2006.01)
*H04L 25/14* (2006.01)
*H04L 25/49* (2006.01)

(52) U.S. Cl.
CPC ............ *H04B 17/21* (2015.01); *H04L 7/10* (2013.01); *H04L 25/03273* (2013.01); *H04L 25/14* (2013.01); *H04L 25/49* (2013.01)

(58) Field of Classification Search
CPC ............. H04L 27/2613; H04L 7/042; H04L 25/03273; H04B 17/21
See application file for complete search history.

(56) References Cited

U.S. PATENT DOCUMENTS 8,489,912 B2   7/2013  Nygren et al.
9,137,008 B2   9/2015  Wiley et al.
(Continued)

FOREIGN PATENT DOCUMENTS

WO   WO-2012122272 A1   9/2012
WO   WO-2015013254 A1   1/2015
(Continued)

OTHER PUBLICATIONS

International Search Report and Written Opinion—PCT/US2017/021955—ISA/EPO—Jun. 16, 2017.

*Primary Examiner* — Chieh M Fan
*Assistant Examiner* — Sung Ahn
(74) *Attorney, Agent, or Firm* — Loza & Loza LLP

(57) ABSTRACT

Methods and apparatus are described that facilitate transmission of data, particularly between two devices within an electronic apparatus. In particular, a preamble for transmission in a sequence of symbols over a multi-wire communications interface, such as a MIPI C-PHY interface, is constructed to include one or more symbols each having a single state transition symbols for signaling a particular calibration preamble from a transmitter to a receiver over the multi-wire communications interface. The preamble, having only single state transition symbols, improves reliability of decoding the symbols at a receiver, including reception and decoding without the use of a calibration clock.

27 Claims, 18 Drawing Sheets

(56) References Cited

U.S. PATENT DOCUMENTS

| | | |
|---|---|---|
| 9,355,054 B2 | 5/2016 | Wu et al. |
| 9,378,171 B2 | 6/2016 | Iyer et al. |
| 2007/0083786 A1 | 4/2007 | Chiang et al. |
| 2007/0104297 A1* | 5/2007 | Gorday ................. H04B 1/707 375/343 |
| 2007/0253467 A1* | 11/2007 | Yang ........................ H04J 11/00 375/141 |
| 2009/0103649 A1* | 4/2009 | Vare ...................... H04L 5/0064 375/295 |
| 2015/0030112 A1* | 1/2015 | Wiley ................ H04L 25/0292 375/360 |

FOREIGN PATENT DOCUMENTS

| | | |
|---|---|---|
| WO | WO-2015148506 A1 | 10/2015 |
| WO | WO-2016126466 A1 | 8/2016 |

* cited by examiner

MULTIPHASE PREAMBLE DATA SEQUENCES FOR RECEIVER CALIBRATION AND MODE DATA SIGNALING

CLAIM OF BENEFIT UNDER 35 U.S.C. § 119

The present application for patent claims the benefit of U.S. Provisional Application No. 62/306,572 entitled "MULTIPHASE PREAMBLE DATA SEQUENCES FOR RECEIVER CALIBRATION AND MODE DATA SIGNALING" filed Mar. 10, 2016, assigned to the assignee hereof and hereby expressly incorporated by reference herein.

BACKGROUND

Field

The present disclosure relates generally to high-speed data communications interfaces, and more particularly, to transmitted preamble sequences used for receiver calibration and mode signaling in multiphase data communication links.

Background

Manufacturers of mobile devices, such as cellular phones, may obtain components of the mobile devices from various sources, including different manufacturers. For example, an application processor in a cellular phone may be obtained from a first manufacturer, while the display for the cellular phone may be obtained from a second manufacturer. Application processors, displays and/or other devices may be interconnected using a physical interface that may be standards-based or proprietary in design. In one example, the physical interface may conform to standards specified by the Mobile Industry Processor Interface (MIPI) Alliance, such as the MIPI C-PHY standard, which is a multi-wire, physical layer interface for camera and display applications, for example.

In a multi-wire interface, the maximum speed of the communication link and the ability of a clock-data recovery (CDR) circuit may be limited by the maximum time variation related to transitions of signals transmitted on the communication link. Transitions on different wires may exhibit different variations in signal transition times, which can cause the outputs of receivers in a receiving device to change at different times with respect to a data or symbol boundary. Large transition time differences in multi-wire signals often requires the implementation of a delay element or circuit in the CDR circuit, where the delay element has a minimum delay that is at least as long as the difference between the minimum and maximum receiver transition events. The maximum time of this delay element can restrict the throughput on the communication link by significantly limiting the period of the transmission clock. Moreover, the maximum time of the delay element may vary with operating conditions, including process, voltage, and temperature.

Accordingly, it is useful to calibrate the delay elements or circuits in a receiver to optimize the performance of the CDR circuit, particularly at higher symbol rates. An effect of this calibration is that it greatly minimizes process, voltage, and temperature variations of the delay elements in the CDR circuit. The delays in the CDR circuit are used to mask multiple signal transitions at a symbol boundary so that the symbol clock can be recovered in a reliable manner. The delay must be long enough to sufficiently mask multiple transitions that result from lossy transmitter (Tx) to receiver (Rx) channels, but short enough so as to not encroach into the transition of the next symbol. If a Preamble including a sequence of symbols is used for calibration, but the calibration circuit needs a longer Preamble, it becomes difficult to coordinate between the transmitter and receiver when the Preamble will be transmitted with a sufficient duration to perform receiver calibration versus transmitting a minimal standard length Preamble to be used to transmit a data burst.

SUMMARY

According to an aspect of the present disclosure, a method for sending calibrating transmissions in a multi-wire communications interface is disclosed. The method includes determining when calibration is to be performed with transmissions over the multi-wire communications interface. Furthermore, the method setting a preamble for at least one transmission over the multi-wire communications interface when calibration is to be performed, the preamble including one or more symbols each having a single state transition.

In another aspect of the present disclosure, an apparatus for use in a multi-wire communications interface is disclosed. The apparatus includes at least one processing circuitry configured to determine when calibration is to be performed with transmissions over the multi-wire communications interface. The processing circuitry is further configured to set a preamble for at least one transmission over the multi-wire communications interface when calibration is to be performed, the preamble including one or more symbols each having a single state transition. Additionally, the apparatus includes a memory coupled to the at least one processing circuitry.

According to yet another aspect of the present disclosure, a processor-readable storage medium having one or more instructions is disclosed. When the instructions are executed by at least one processing circuitry the instructions cause the at least one processing circuitry to determine when calibration is to be performed with transmissions over the multi-wire communications interface. Additionally, the instructions cause the at least one processing circuitry to set a preamble for at least one transmission over the multi-wire communications interface when calibration is to be performed, the preamble including one or more symbols each having a single state transition.

In still one further aspect of the present disclosure, a method for receiving transmissions in a multi-wire communications interface is disclosed. The method for receiving includes receiving a transmission at a receiver from a transmitter over the multi-wire communications interface, the transmission including a calibration preamble having one or more symbols each having a single state transition. Additionally, the method includes performing calibration of delay circuits in the receiver based on the received calibration preamble.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the claims should generally be construed to mean "one or more" unless specified otherwise or clear from the context to be directed to a singular form.

The present disclosure describes methods and apparatus that achieve reliable transmission of information at a maximum symbol rate with an N-phase transmitter over a physical interface to a corresponding receiver before the receiver has had an opportunity to calibrate its clock recovery circuit (e.g., CDR circuitry). This reliability may be realized through the use of particular symbol sequences selected by the transmitter to be placed in the Preamble sequence. The particular symbol sequences chosen are those that do not require a calibrated clock recovery circuit for reliable reception of these symbol sequences, as will be discussed in detail herein.

Figure 1:
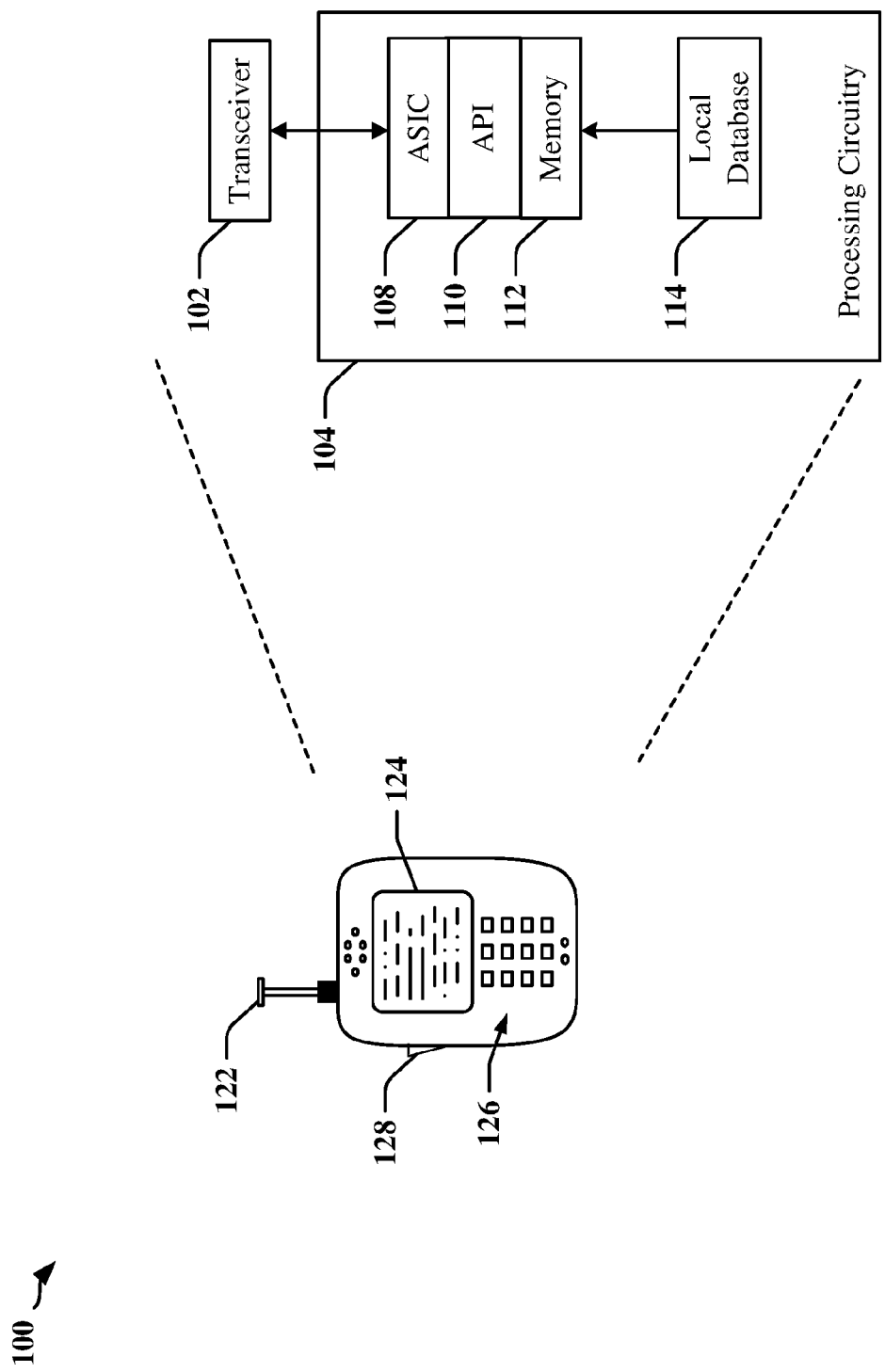
FIG. 1 illustrates an apparatus employing a data link between IC devices that selectively operates according to one of plurality of available standards.

Certain aspects of the presently disclosed apparatus and methods may be applicable to communications links or interfaces between electronic devices that may include subcomponents of an apparatus such as a mobile telephone, a mobile computing device, an appliance, automobile electronics, avionics systems, etc. FIG. 1 illustrates a simplified example of an apparatus that employs communication links or interfaces between IC devices. The apparatus 100 includes a communications transceiver 102 operably coupled to processing circuitry 104. In one example, the apparatus 100 may include a wireless communication device that communicates with a radio access network (RAN), a core access network, the Internet and/or another network via the communications transceiver 102, which may be configured as a radio frequency (RF) transceiver. The processing circuitry 104 may include an application-specific IC (ASIC) 108 and/or one or more other IC devices. The ASIC 108 may include one or more processing devices, logic circuits, or other processing circuitry. Processing circuitry 104 may include and/or be coupled to processor readable storage such as a memory 112 that may maintain instructions that may be executed by a processor of the processing circuitry 104 and data, which may be manipulated by the processing circuitry 104. Certain functions of the processing circuitry 104 may be controlled by one or more of an operating system and an application programming interface (API) 110 layer that supports and enables execution of software modules residing in storage media, such as the memory device 112. The memory device 112 may include read-only memory (ROM) or random-access memory (RAM), electrically erasable programmable ROM (EEPROM), flash cards, or any memory device that can be used in processing systems and computing platforms. The processing circuitry 104 may include or access a local database 114 that maintains operational parameters and other information used to configure and operate the apparatus 100. The local database 114 may be implemented using one or more of a database module, flash memory, magnetic media, EEPROM, optical media, tape, soft or hard disk, or the like. The processing circuitry 104 may also be operably coupled to external devices such as an antenna 122, a display 124, operator controls, such as a keypad 126, a button, rocker or slider switch 128, and/or other components.

Figure 2:
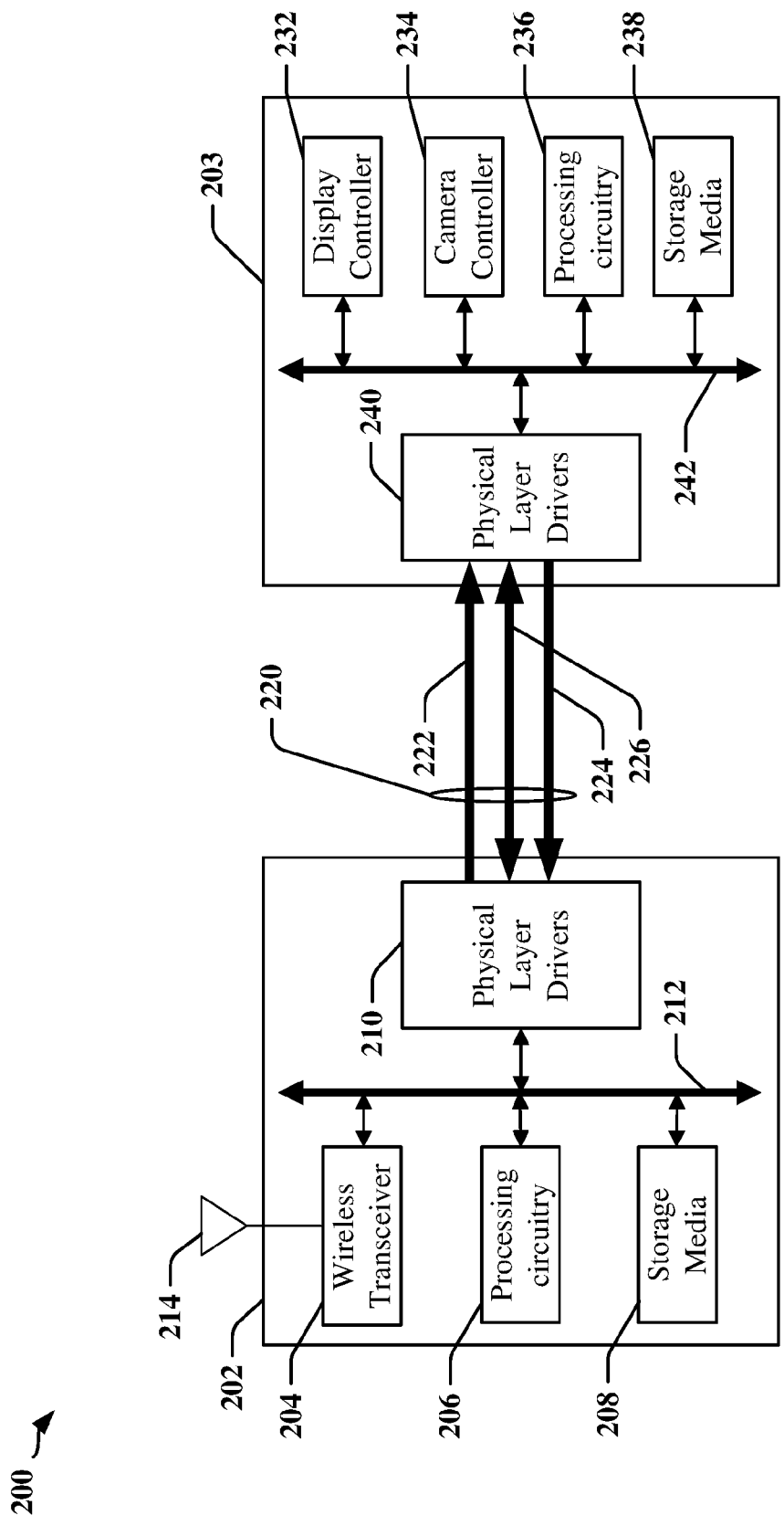
FIG. 2 illustrates a system architecture for an apparatus employing a data link between IC devices operable according to one of plurality of available standards.

FIG. 2 is a block schematic diagram illustrating certain aspects of an apparatus 200 such as a wireless mobile device, a mobile telephone, a mobile computing system, a wireless telephone, a notebook computer, a tablet computing device, a media player, a gaming device, an appliance, a wearable computing device, or the like. The apparatus 200 may include a plurality of IC devices 202 and 203 that exchange data and control information through a communication link 220. The communication link 220 may be used to connect the IC devices 202 and 203, whether the IC devices 202 and 203 are located in close proximity to one another, or located in physically different parts of the apparatus 200. In one example, the communication link 220 may be provided on a chip carrier, substrate or circuit board that carries the IC devices 202 and 203. In another example, a first IC device 202 may be located in a keypad section of a phone while a second IC device 203 may be located in a display section of the phone. In another example, a portion of the communication link 220 may include a cable or optical connection. In an aspect, the first IC device may be an application processor and the second IC device may be one or more peripheral ICs or a system-on-a-chip.

The communication link 220 may include multiple channels 222, 224, and 226. One or more of the channels may be unidirectional, as in the exemplary illustrated channels 222, and 224, or bidirectional, as in the case of the exemplary illustrated channel 226, and the channels may operate in a half-duplex mode and/or in a full-duplex mode. Furthermore, the communication link 220 may be asymmetrical, providing higher bandwidth in one direction. In one example, a first communications channel 222 may be referred to as a forward link 222 while a second communications channel 224 may be referred to as a reverse link 224. The first IC device 202 may be designated as a host system or a transmitter, while the second IC device 203 may be designated as a client system or a receiver, even if both IC devices 202 and 203 are configured to transmit and receive on the communications link 222. In one example, the forward link 222 may operate at a higher data rate when communicating data from the first IC device 202 to the second IC device 203, while the reverse link 224 may operate at a lower data rate when communicating data from the second IC device 203 to the first IC device 202.

The IC devices 202 and 203 may each include a processor 206, 236, which may be provided on a processing circuitry, computing circuitry, or other devices. In one example, the first IC device 202 may be adapted to perform core functions of the apparatus 200, including maintaining wireless communications through a wireless transceiver 204 and an antenna 214, while the second IC device 203 may be configured to support a user interface that manages or operates a display controller 232, and may control operations of a camera or video input device using a camera controller 234. Other features supported by one or more of the IC devices 202 and 203 may include a keyboard, a voice-recognition component, global positioning systems, biometric recognition systems, motion sensors, and other input or output devices. The display controller 232 may include circuits and software drivers that support displays such as a liquid crystal display (LCD) panel, touch-screen display, indicators, and so on. The storage media 208 and 238 may include transitory and/or non-transitory storage devices adapted to maintain instructions and data used by respective processing circuitry 206 and 236, and/or other components of the IC devices 202 and 203. Communication between each processing circuitry 206, 236 and its corresponding storage media 208 and 238 and other modules and circuits may be facilitated by one or more buses 212 and 242, respectively.

Reverse link 224 may be operated in the same manner as the forward link 222, and the forward link 222 and reverse link 224 may be capable of transmitting at comparable speeds or at different speeds, where speed may be expressed as a data rate (or data transfer rate) and/or a transmitter clocking rate. The forward and reverse data rates may be substantially the same or may differ by orders of magnitude, depending on the application. In some applications, a single bidirectional link 226 may support communications between the first IC device 202 and the second IC device 203. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate data, control, command and other information between the first IC device 202 and the second IC device 203 in accordance with an industry or other standard.

Industry standards may be application specific. In one example, the MIPI standard defines physical layer interfaces including an interface specification (e.g., C-PHY) between an application processor (e.g., IC device 202) and camera or display modules in a mobile device (e.g., IC 203, individual controllers 232, 234, or a system on a chip including camera and/or display modules). The C-PHY specification governs the operational characteristics of products that comply with MIPI specifications for mobile devices. A C-PHY interface may support data transfers using a flexible, low-cost, high-speed serial interface that interconnects between components 202 and 203 within a mobile device. These interfaces may include complimentary metal-oxide-semiconductor (CMOS) parallel busses providing relatively low bit rates with slow edges to avoid electromagnetic interference (EMI) issues.

The communication link 220 of FIG. 2 may be implemented as a wired bus that includes a plurality of signal wires (denoted as M wires). The M wires may be configured to carry N-phase encoded data in a high-speed digital interface, such as in a camera or display interface. The M wires may facilitate N-phase polarity encoding on one or more of the channels 222, 224, and 226. The physical layer drivers 210 and 240 may be configured or adapted to generate N-phase polarity encoded data symbols for transmission on the communication link 220, and/or to decode N-phase polarity encoded data symbols received from the communication link 220. The use of N-phase polarity encoding provides high speed data transfer and may consume half or less of the power of other interfaces because fewer drivers are active in N-phase polarity encoded data links 220.

N-phase polarity encoding devices 210 and/or 240 can typically encode multiple bits per transition on the communication link 220. In one example, a combination of 3-phase encoding and polarity encoding may be used to support a wide video graphics array (WVGA) LCD driver IC without a frame buffer, delivering pixel data at 810 Mbps for display refresh. In another aspect, the encoding and/or decoding devices 210 and 240, along with communication link 220 may constitute an N-phase high speed interface operable according to MIPI standards, such as D-PHY or C-PHY physical standards.

Figure 3:
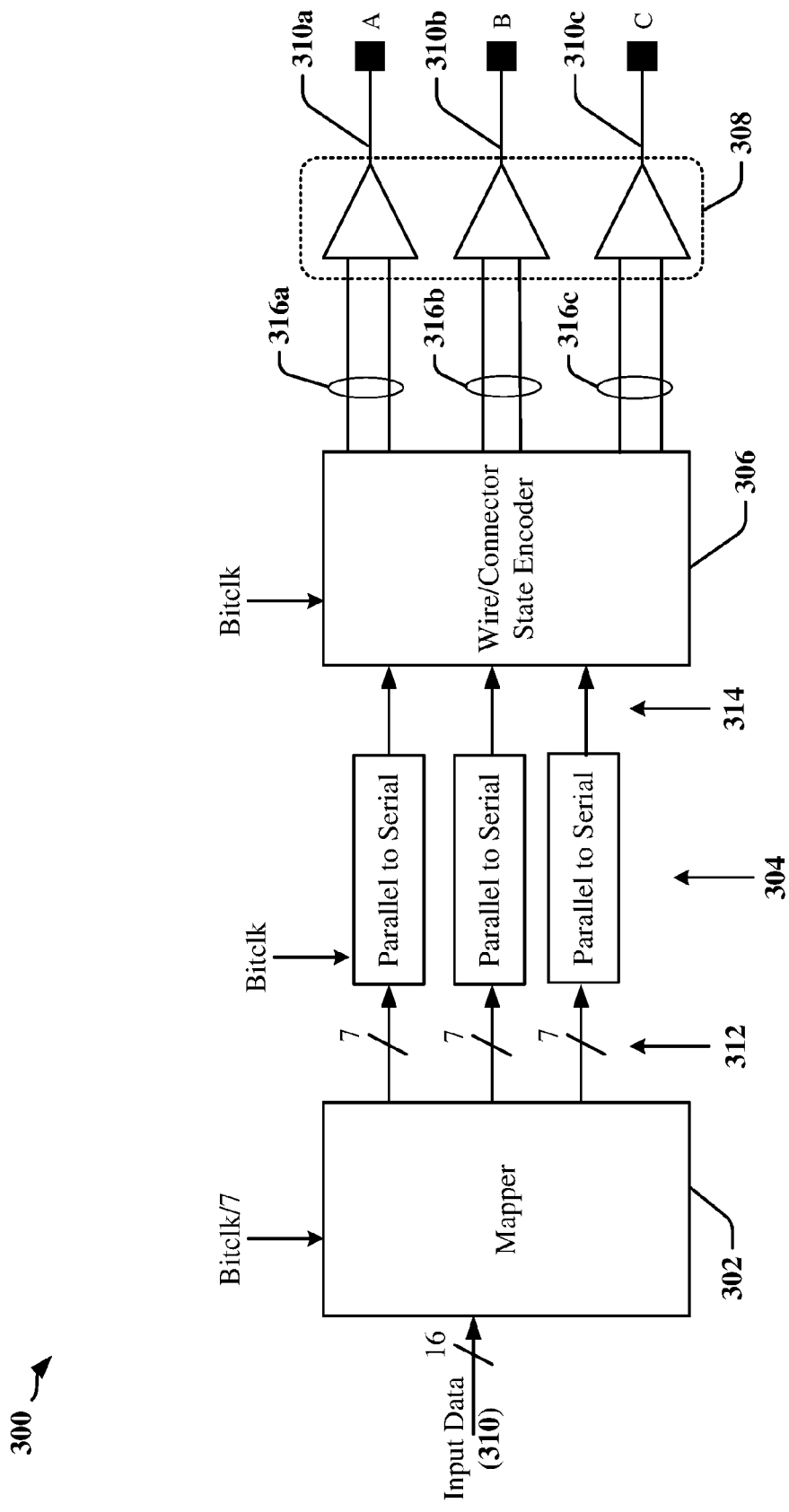
FIG. 3 illustrates an N-phase encoder.

FIG. 3 is a schematic diagram illustrating an example of an M-wire, N-phase polarity encoder 300 that may be used to implement certain aspects of the interface shown in FIG. 2 including elements 210 and 220. In the example of FIG. 3, the M-wire, N-phase polarity encoder transmitter is configured to transmit information using M=3 wires and N=3 phase signaling. The example of 3-wire, 3-phase encoding is exemplary and shown solely for the purpose of simplifying descriptions of certain aspects of the present disclosure. Accordingly, it will be appreciated by those skilled in the art that the principles and techniques disclosed for 3-wire, 3-phase encoders can be applied to other configurations of M-wire, N-phase polarity encoders and decoders, such as where N>3.

Signaling states defined for each of the M wires in an M-wire, N-phase polarity encoding scheme may include an undriven state, a positively driven state and a negatively driven state in one example. In the 3-wire, 3-phase polarity encoding scheme, the positively driven state and the negatively driven state may be obtained by providing a voltage differential between two of the illustrated three signal wires; i.e., 310a, also denoted as "A", 310b, also denoted as "B", and 310c, also denoted as "C". Alternatively, the states may be effectuated by driving a current through a selected two of the three signal wires 310a, 310b, and 310c connected in series such that the current flows in different directions in the two selected signal wires 310a, 310b and/or 310c. An undriven state may be realized by placing an output of a driver of a signal wire 310a, 310b or 310c in a high-impedance mode.

Alternatively, or additionally, an undriven state may be obtained on a signal wire 310a, 310b or 310c by passively or actively causing an "undriven" signal wire 310a, 310b or 310c to assume a voltage level that lies substantially halfway between positive and negative voltage levels provided on driven signal wires 310a, 310b and/or 310c. Typically, no significant current flows through an undriven signal wire 310a, 310b or 310c. Signaling states defined for a 3-wire, 3-phase polarity encoding scheme may be denoted using the three signaling states {+1, 0, −1}, which may represent voltage or current states. In one example, the three states {+1, 0, −1} may signify the three voltage levels +V, 0, −V. In another example, the three states {+1, 0, −1} may signify the three voltage levels +V, +V/2, 0. In another example, the three states {+1, 0, −1} may signify currents of I, 0, −I. In yet another example, rather than using negative and zero voltages, the states may be fractions of a source voltage V. For example, the three voltage levels denoted as high, mid, and low, and could be at voltages ¾V, ½V, and ¼V, for example, to signify the three voltage states.

A 3-wire, 3-phase, polarity encoder may employ a set of drivers 308 to control the signaling state of connectors 310a, 310b and 310c. The drivers 308 may be implemented as unit-level current-mode or voltage-mode drivers. Each driver in the set of drivers 308 may receive respective sets of signals 316a, 316b, or 316c that determine the signaling state of corresponding connector 310a, 310b, or 310c. In the example depicted, each of the drivers in set 308 receives a pair of signals 316a, 316b, or 316c that defines four states for the corresponding connector 310a, 310b or 310c. In another example, each driver 308 may receive a set of three signals defining 8 states for the corresponding connector 310a, 310b, or 310c.

For each transmitted symbol interval in an M-wire, N-phase polarity encoding scheme, at least one signal wire 310a, 310b or 310c is in the undriven state (0 signaling state), while the number of positively driven (+1 signaling state) signal wires 310a, 310b or 310c is equal to the number of negatively driven (−1 signaling state) signal wires 310a, 310b or 310c, such that the sum of current flowing to the receiver is zero. At each symbol transition, between the previously transmitted symbol and a next transmitted symbol, the state of at least one signal wire 310a, 310b or 310c changes. When the signaling state of at least one signal wire 310a, 310b and/or 310c changed between each pair of consecutive symbols, a receiver can reliably generate a receive clock based on the transitions.

In operation, a mapper 302 may receive and map input data 310 to a set of symbols 312. In the depicted 3-wire, 3-phase example, the set of symbols includes seven 3-bit symbols such that a 16-bit word of the input data 310 may be encoded in each set of symbols. Each bit of a 3-bit symbol defines the state of one of the signal wires 310a, 310b and 310c for one symbol interval. The sequence of symbols 312 may be serialized using parallel-to-serial converters 304 that provide a timed sequence of symbols 314, each symbol defining the signaling state of the 3-wires 310a, 310b and 310c. The sequence of symbols 314 is typically timed using a transmission clock to delineate symbol intervals, whereby a single symbol is transmitted in each symbol interval. An M-wire phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols. A non-integer number of data bits may be encoded in each symbol. In the example of a 3-wire, 3-phase system, there are 3 available combinations of 2 wires that may be driven simultaneously, and 2 possible combinations of polarity on the pair of wires that is driven, yielding 6 possible phase-polarity states for a 3-wire system, which are typically denoted by +x, −x, +y, −y, +z, and −z. The signaling state of the signal wires 310a, 310b and 310c changes at each transition between symbols and, accordingly, 5 of the 6 states are available at every transition. In other words, the state of at least one wire changes at each transition to permit a receiver to generate a reliable receive clock and, given a current signaling state, there are five possible signaling states available at each transition. With five (5) available states, $\log_2(5) \approx 2.32$ bits may be encoded per symbol. Accordingly, in one example a mapper may accept a 16-bit word and convert it to 7 symbols because 7 symbols carrying 2.32 bits per symbol can encode up to 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
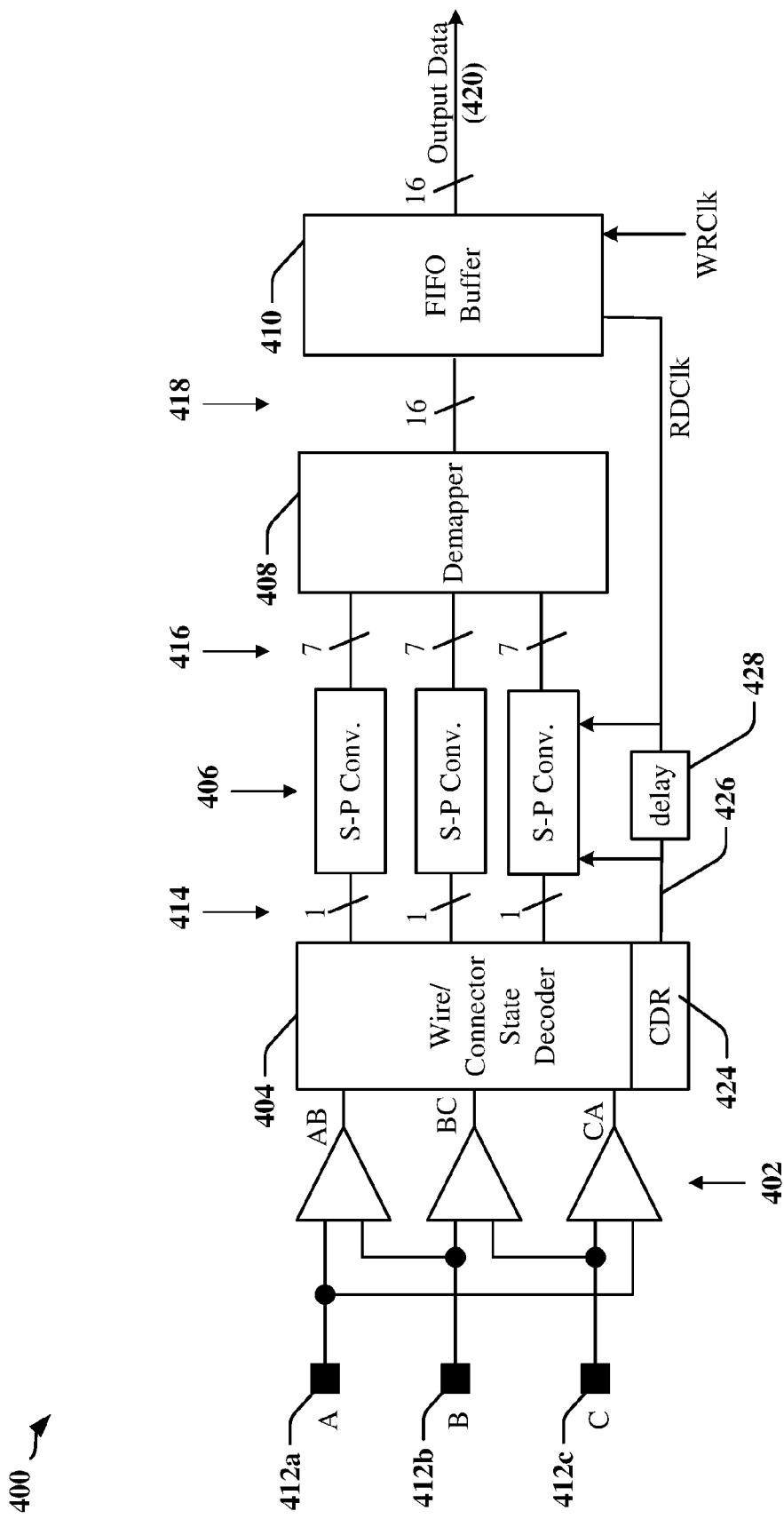
FIG. 4 illustrates an N-phase decoder.

FIG. 4 is a diagram illustrating certain aspects of a 3-wire, 3-phase decoder 400 in a high speed interface, such as those depicted by elements 220 and 240 in FIG. 2. The decoder 400 receives the single ended signals A, B, C transmitted by the encoder (e.g., 300 in FIG. 3), but then receives and decodes based on differential signal based on pairs AB, BC, or CA. Differential receivers 402 and a wire state decoder 404 are configured to provide a digital representation of the state of the three possible pairings of signal wires 412a, 412b, and 412c (i.e. AB, BC, and CA shown at the respective outputs of the differential amplifiers 402), with respect to one another, and to detect changes in the signaling state of the three signal wires 412a, 412b and 412c compared to the signaling state of the three signal wires 412a, 412b and 412c in the previous symbol period. The digital representation of the signaling state of the three signal wires 412a, 412b and 412c during a symbol period may be referred to as a raw symbol. In one example of a 3-phase system, a sequence of seven consecutive raw symbols 414 are assembled by serial to parallel convertors 406 to obtain a set of 7 symbols 416 to be processed by demapper 408. The demapper 408, in this example, then produces 16 bits of output data 418 that may be buffered in FIFO 410 to provide output data 420.

In operation, the wire state decoder 404 may extract a sequence of symbols 414 from signals received on wires 412a. 412b and 412c. The symbols 414 are decoded based on signaling states that may be represented as a combination of phase rotation and polarity of the signals received on wires 412a, 412b and 412c, as disclosed herein. The wire state decoder 404 may include a CDR 424, which extracts a clock 426 that can be used to reliably capture symbols from the wires 412a, 412b and 412c. The CDR 424 may be configured to generate the clock 426 based on the occurrence of a transition on least one of the wires 412a, 412b and 412c at each boundary between consecutive symbol intervals. An edge of the clock 426 may be delayed to allow time for all wires 412a, 412b and 412c to have stabilized and to thereby ensure that the current symbol is captured for decoding purposes.

The delay used by the CDR may be configured to allow a period of time sufficient to mask the effect of multiple edges generated at different times by the differential receivers 402. These multiple edges can arise when certain state transitions cause different differential receivers 402 to produce edges that may be separated in time with respect to one another. The CDR 424 may include a delay element 428 that delays response to a first occurring edge at a symbol boundary until a time when all possible edges would have occurred. Variations in the performance of components of the CDR 424 may be expected to affect the delays between multiple edges, and these variations in performance of the CDR 424 may be accommodated by configuring a delay for the CDR 424 that accounts for worst case conditions. The variations in performance may be caused by changes in process, voltage, and thermal (PVT) conditions, for example. The increased delay may limit the maximum clock speed usable in the communications link. If the configured delay is too short, then multiple clock pulses may be created for a single symbol, which may cause loss of synchronization between transmitter and receiver. If the delay is too long, symbol times may overlap, thereby causing the clock recovery circuit to malfunction or to generate a single pulse for two symbol intervals.

Figure 5:
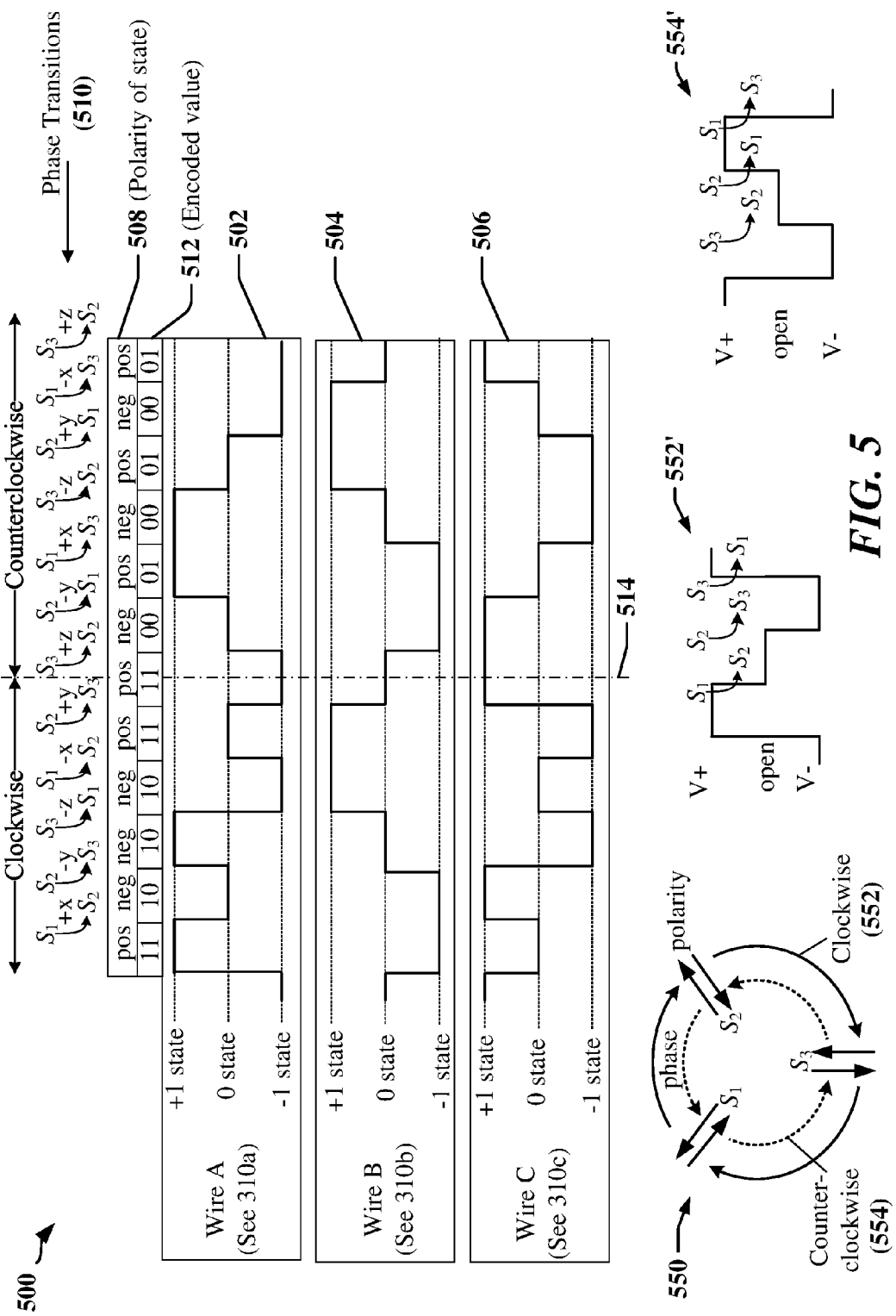
FIG. 5 illustrates signaling in an N-phase polarity encoded interface.

FIG. 5 is a diagram that includes an example of a timing chart 500 for signals encoded using a three-phase modulation data-encoding scheme, which is illustrated by the circular state diagram 550. Information may be encoded in a sequence of signaling states where, for example, a wire or connector is in one of three phase states $S_1$, $S_2$ and $S_3$ defined by the state diagram 550. Each state may be separated from the other states by a 120° phase shift. In one example, data may be encoded in the direction of rotation of phase states on the wire or connector. The phase states in a signal may rotate in clockwise direction 552 and 552' or counterclockwise direction 554 and 554'. In the clockwise direction 552 and 554' for example, the phase states may advance in a sequence that includes one or more of the transitions from $S_1$ to $S_2$, from $S_2$ to $S_3$ and from $S_3$ to $S_1$. In the counterclockwise direction 554 and 554', the phase states may advance in a sequence that includes one or more of the transitions from $S_1$ to $S_3$, from $S_3$ to $S_2$ and from $S_2$ to $S_1$. The three wires 310a, 310b, and 310c from the apparatus of FIG. 3, for example, carry different phase-shifted versions of the same signal, where the versions are phase shifted by 120° with respect to one another. Each signaling state may be represented as a different voltage level on a wire or connector and/or a direction of current flow through the wire or connector. During each of the sequence of signaling states in a 3-wire system, each wire 310a, 310b and 310c is in a different signaling state than the other wires. When more than 3 wires 310a, 310b and 310c are used in a 3-phase encoding system, two or more wires 310a, 310b and/or 310c can be in the same signaling state at each signaling interval, although each state is present on at least one wire 310a, 310b and/or 310c in every signaling interval.

Information may be encoded in the direction of rotation at each phase transition 510, and the 3-phase signal may change direction for each signaling state. Direction of rotation may be determined by considering which wires 310a, 310b and/or 310c are in the '0' state (e.g., the undriven state) before and after a phase transition, because the undriven wire 310a, 310b and/or 310c changes at every signaling state in a rotating three-phase signal, regardless of the direction of rotation.

The encoding scheme may also encode information in the polarity 508 of the two of the conductors 310a, 310b and 310c that are actively driven. At any time in a 3-wire implementation, exactly two of the conductors 310a, 310b, and 310c are driven with currents in opposite directions and/or with a voltage differential. In a simple implementation, data 512 may be encoded using two bit values 512, where one bit is encoded in the direction of phase transitions 510 and the second bit is encoded in the polarity for the current state 508.

The timing chart 500 illustrates data encoding using both phase rotation direction and polarity. The graphs 502, 504 and 506 relate to signals carried on three wires 310a, 310b and 310c (i.e., A, B, and C), respectively for multiple phase states. Initially, the phase transitions 510 are in a clockwise direction and the most significant bit is set to binary "1," until the rotation of phase transitions 510 switches at a time 514 to a counterclockwise direction, as represented by a binary "0" of the most significant bit. The least significant bit reflects the polarity 508 of the signal in each state. Additionally, it is noted that in other aspects the encoded values may include a third bit indicative of the rotation direction— either clockwise or counterclockwise. In an example, the bit value "1" could denote a clockwise rotation and the bit value "0" a counterclockwise rotation. This bit may be a middle bit (i.e., neither the LSB or MSB) in a three bit value or vector.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available for transition from any current state. Accordingly, there may be $\log_2(5) \approx 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right)$$

Figure 6:
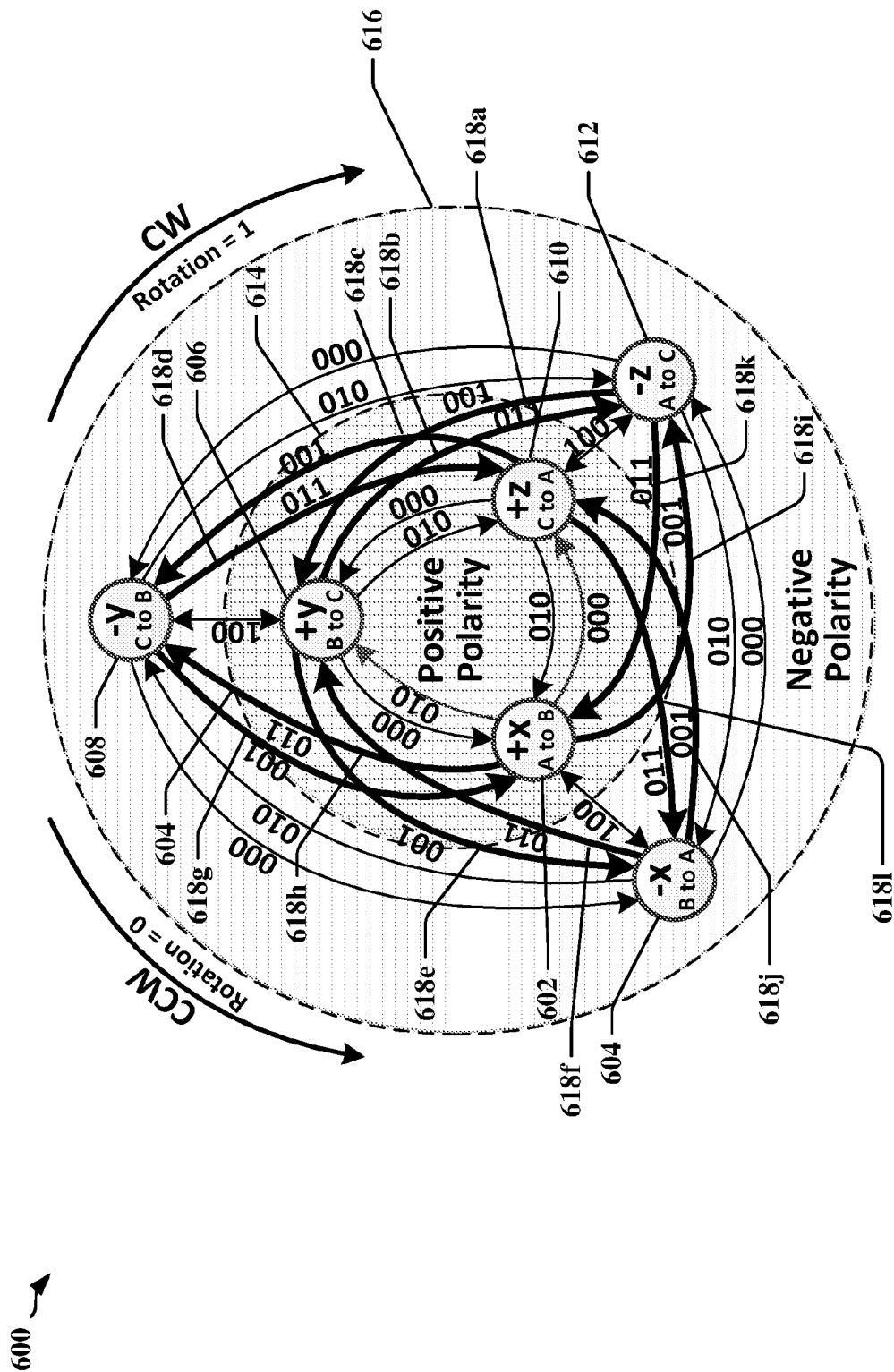
FIG. 6 is a state diagram illustrating potential state transitions in an M-wire, N-phase polarity decoder.

FIG. 6 is a state diagram 600 illustrating 6 possible phase-polarity states and the 30 possible state transitions therebetween in the example of a 3-wire, 3-phase communication link. The six (6) possible states, as discussed above, are typically denoted as +x, −x, +y, −y, +z, and −z, and are respectively called out in FIG. 6 with reference numbers 602, 604, 606, 608, 610, and 612 in the state diagram 600. The state diagram 600 also illustrates that states +x (602), +y (606), and +z (610) have a positive polarity and lie within an inner orbital 614 of positive polarity states. Correlatively, states −x (604), −y (608), and −z (612) have negative polarity, and lie within a negative polarity state orbital 616.

The state diagram 600 also shows the various 30 different state transitions that may take place between the six states 602, 604, 606, 608, 610, and 612 (i.e., each of the six states can transition to one of the other five (5) remaining states; thus 6×5 or 30 possible transitions). Each of the transitions is shown with a corresponding 3 bit value or vector, where the LSB in the vector indicates polarity (e.g., "0" indicates no polarity change, such as transitions from −x to −y, whereas "1" indicates a polarity change, such as −x to +y), the middle bit in the vector indicates clockwise or counter-clockwise rotation for the transition, and the MSB in the vector indicates flip or phase change.

It is noted that in order to calibrate the receiver (e.g., the receiver decoder 400 shown in FIG. 4) it is convenient to receive a high-speed signal to be able to properly adjust delay circuits in the receiver clock recovery function. It is difficult, however, to properly receive the high-speed signal and use it for delay calibration when the delays in the high-speed clock recovery circuits have not been calibrated. Thus, according to the present disclosure, a solution to this problem is to transmit a calibration sequence that consists of symbols having only a single transition at each symbol boundary. This property may provide reliable calibration so that multiple edges at each symbol or unit interval boundary don't cause ambiguity for the calibration algorithm. Known symbol sequences for a preamble presently include using a sequence of single-transition symbols. In one aspect, it is known to construct a preamble consisting of a sequence of all "3" symbols, which are defined using the [flip, rotation, polarity] vector equal to 011, where these particular values in the vector would indicate no flip, clockwise rotation, and polarity change. Another symbol that results in a single transition is a symbol value of "1", which has a [flip, rotation, polarity] vector of 001, or no flip, counterclockwise rotation, and polarity change. The single-transition symbols are illustrated in the state transition diagram of FIG. 6 6 using state transition arcs that are bold and dark (See the twelve state transition arcs having reference numbers 618a-618l in FIG. 6 representing the twelve possible single-transition symbols).

Figure 7:
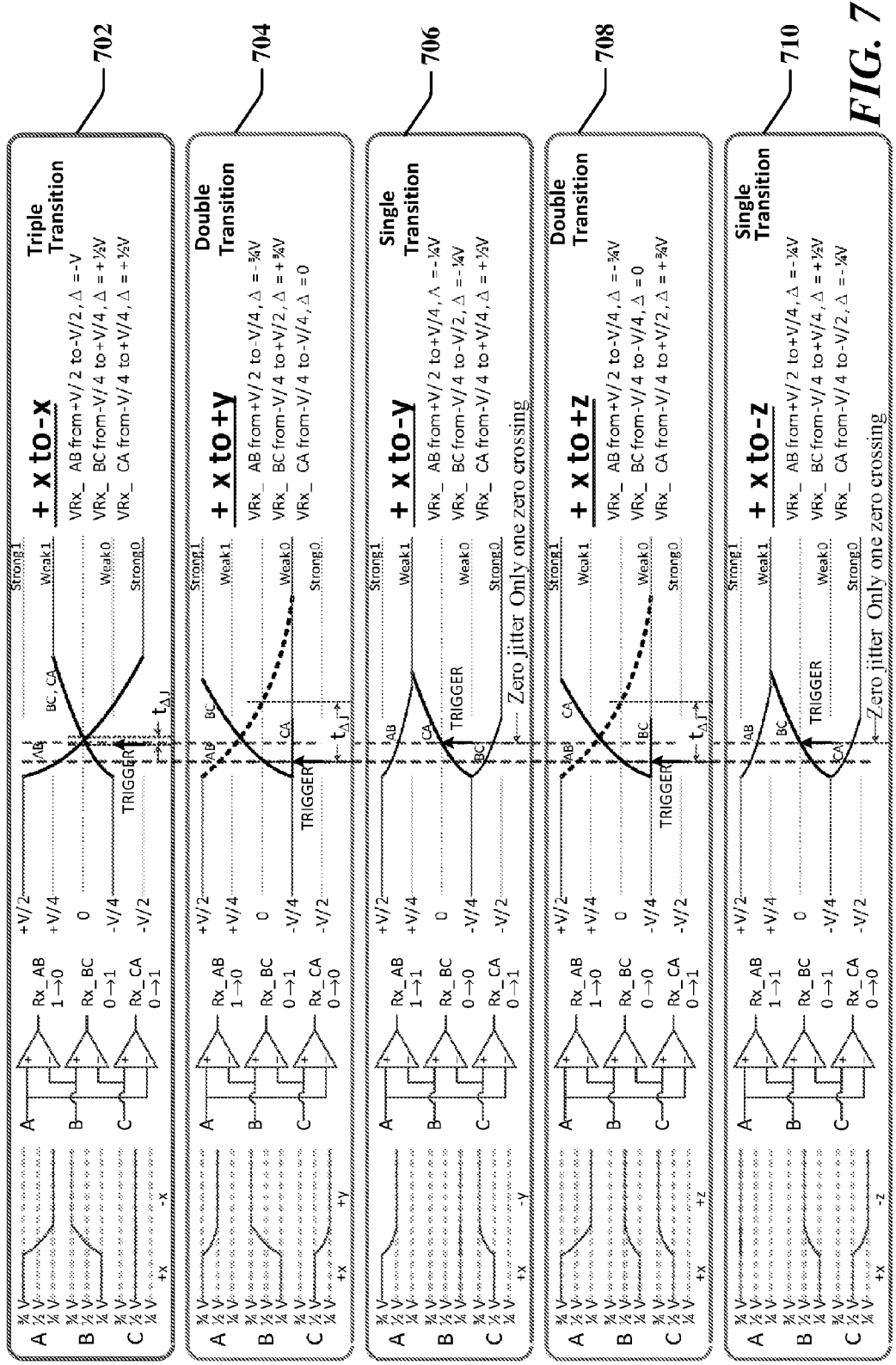
FIG. 7 shows timing charts illustrating examples of transition regions in N-phase polarity encoding and decoding.

FIG. 7 illustrates a number of timing charts illustrating examples of certain possible transitions from a first state to a second state of the six possible states −x, +x, −y, +y, +z, or −z in the example of a 3 wire system. In the particular illustrated example of FIG. 7, the five possible transitions from state symbol +x in a MIPI C-PHY 3-Phase system are shown with timing charts 702, 704, 706, 708, and 710. Taking the example of changing from state symbol +x to −x shown at 702, the three wire inputs from lines A, B, and C are shown, where the voltage on line A transitions from ¾V to ¼V, the voltage on line B transitions from ¼V to ¾V and the voltage on line C remains constant at ½V through the transition at symbol transition. The resultant changes at the differential receiver amplifiers for the line pairs are that the AB pair cause the respective amplifier to change output from +V/2 to −V/2 with a voltage difference measurement of Δ=−V, the BC pair cause the respective amplifier to change output from −V/4 to +V/4 with a change Δ=+V/2, and the CA pair cause the respective amplifier to change output from −V/4 to +V/4 with a change Δ=+V/2. As may be seen in the corresponding graph of the amplifier input voltages, all three pairs AB, BC, and CA result in three zero voltage level crossings (and corresponding bit state changes such as 100 to 011 in the example of 702), which is termed a triple transition. Accordingly, each of bit values changes state from 0 to 1 or 1 to 0. Similarly, the state changes +x to +y (704) and +x to +z (708) result in multiple zero crossings, in these cases two (2) transitions or double transitions. Of note in the transitions depicted by diagrams 702, 706, and 708 is that each has a signal transition time ($t_{AJ}$) from the first occurrence of zero crossing (i.e., a trigger time) to last occurrence of a zero crossing, during which time there is uncertainty of the of the signals due to the slew rates of the rising or falling signal, which hinders reliable decoding.

In contrast to examples 702, 706, and 708 discussed above, the examples of 706 and 710 show transitions from +x to −y and +x to −z, which both result in only a single transition. In particular, the CA pairing in the example of 706 changes the output of the respective amplifier from −V/4 to +V/4 resulting in a zero crossing, whereas the outputs of the amplifiers for pairs AB and BC remain positive and negative, respectively, despite respective −¼V and +¼V changes. Thus, only a single transition occurs in this state change; i.e., a single zero crossing such that the vectors change one bit such as 100 to 101 in the cased of example 706 or 100 to 110 in the case of example 710. Additionally, since only a single zero crossing occurs, the transition timing is minimized and there is zero jitter on the clock signal, reducing decoding uncertainty at the receiver. Referring back to FIG. 6, it is noted that in the example of the illustrated 3-Phase system, 12 single transitions are extant in the system, which are denoted by bolded arrows and reference numbers 618a-618l. It is noted that although the examples of FIGS. 6 and 7 relate to 3-Phase systems, the present methods and apparatus are applicable to N-Phase systems where N>3, and where the number of single transitions between states would be more than 12.

Figure 8:
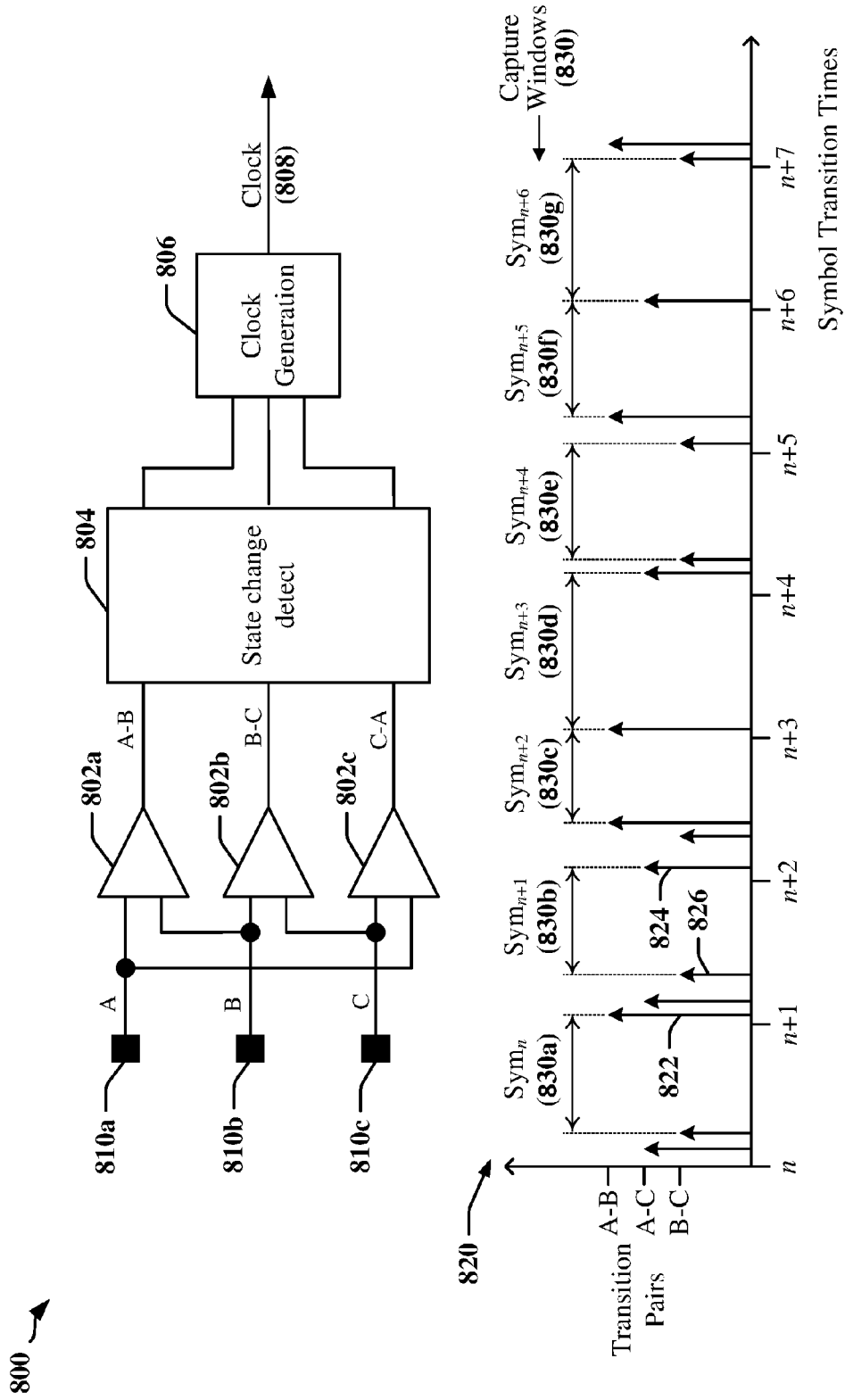
FIG. 8 illustrates transition detection in an M-wire, N-phase polarity decoder.

FIG. 8 includes a block schematic diagram 800 illustrating certain aspects of clock generation in a 3-wire, 3-phase decoder. A set of differential receivers 802a, 802b and 802c compares each of three wires 810a, 810b and 810c (A, B, C) with the other of the three wires 810a, 810b and 810c. In the example depicted, the differential pairings are A-B, B-C, and C-A. As described herein, the signaling state of at least one of the wires 810a, 810b and 810c changes at each symbol boundary. Accordingly, a state change detection circuit 804 can detect the occurrence of a change in signaling state because the output of at least one of the differential receivers 802a, 802b and 802c changes at the end of each symbol interval.

Certain signaling state transitions may be detectable by a single differential receiver 802a, 802b or 802c, while other signaling state transitions may be detected by two or more of the differential receivers 802a, 802b and 802c. In one example the signaling states, or relative states of two wires may be unchanged after a transition and the output of a corresponding differential receiver 802a, 802b or 802c may also be unchanged after the symbol transition. In another example, both wires in a pair of wires 802a, 802b and/or 802c may be in the same state in a first time interval and both wires may be in a same second state in a second time interval, such that the corresponding differential receiver 802a, 802b or 802c may be unchanged after the phase transition. Accordingly, a clock generation circuit 806 may include signaling state change detect circuits and logic 804 that monitor the outputs of all differential receivers 802a, 802b and 802c in order to determine when a signaling state transition has occurred, The clock generation circuit may generate a receive clock 808 based on detected signaling state transitions.

Changes in signaling states may be detected at different times on different wires 810a, 810b and/or 810c. The timing of detection of signaling state changes may vary according to the type of signaling state change that has occurred. The result of this variability is illustrated in the simplified timing diagram 820. Markers 822, 824, and 826 representing the outputs of the signaling state change detection circuit 804 and/or differential receivers 802a, 802b and 802c are assigned different heights for clarity of illustration only. The relative heights of markers 822, 824, and 726 have no specific relationship to voltage or current levels, polarity or weighting values used for clock generation or data decoding. The timing chart 820 illustrates the effect of timing of transitions associated with symbols transmitted on the three wires 810a, 810b and 810c. In the timing chart 820, transitions between some symbols may result in variable capture windows 830a, 830b, 830c, 830d, 830e, 830f and/or 830g (collectively, the symbol capture windows 830) during which symbols may be reliably captured. The number of signaling state changes detected and their relative timing can result in jitter on the clock signal 808.

Figure 9:
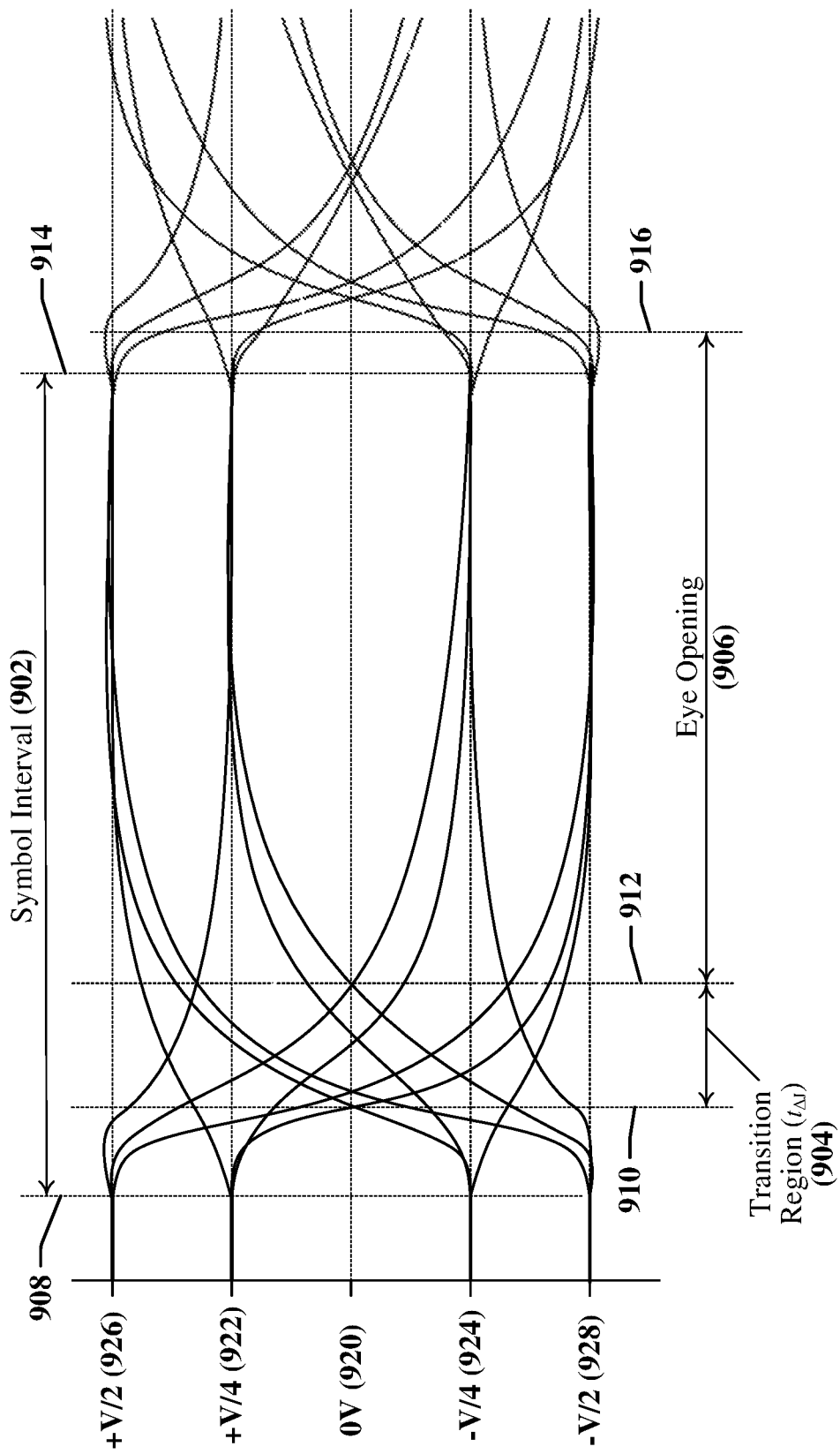
FIG. 9 is a diagram illustrating transition and eye regions in an M-wire N-phase decoder.

FIG. 9 is a diagram showing simplified eye chart that may be generated from an overlay of multiple symbol intervals 902. The signal transition region 904, as mentioned above, is a time period of uncertainty where variable signal rise or fall times (or slew rates) prevent reliable decoding. State information may be determined reliably in an "eye opening" 906 representing the time period in which the symbol is stable and can be reliably received and decoded. In one example, the eye opening 906 may be determined to begin at the end 912 of the signal transition region 904, and end at the termination 914 of the symbol interval 902. In the example depicted in FIG. 9, the eye opening 906 may be determined to begin at the end 912 of the signal transition region 904, and end at a time 916 when the signaling state of the outputs of the three differential receivers 402 have begun to change.

The maximum speed of the communication link 220 configured for N-Phase encoding may be limited by the duration of the signal transition region 904 compared to the received signal eye opening 906. The minimum period for the symbol interval 902 may be constrained by tightened design margins associated with the CDR circuit 424 in the N-Phase decoder 400 illustrated in FIG. 4, or in the clock generation circuit 806 of FIG. 8, for example. Different signaling state transitions may be associated with different variations in signal transition times corresponding to two or more wires 810a, 810b and/or 810c, thereby causing the outputs of the differential receivers 802a, 802b and 802c in the receiving device to change at different times with respect to the symbol boundary 908, where the inputs to the differential receivers 802a, 802b and 802c begin to change. The large difference in received signal transition times between the outputs of multiple differential receivers 802a, 802b, and 802c in the receiving device typically requires the implementation of a delay element in the CDR circuit 424 that has a minimum delay that exceeds the transition region time 904. In one example, a delay element may be provided in one or more of the state change detect circuit 804 and/or the clock generation circuit 806 shown in FIG. 8. The maximum delay time provided by this delay element may not exceed the closing edge 916 of the eye opening 906, which may be coincident with the commencement of the beginning of the next symbol interval at time 914 in some instances. At faster data rates, the eye opening 906 can become small in comparison to the symbol interval 902 and the effect of symbol transition variability may be determinative of the maximum symbol transmission rate.

The duration of any single transition is unlikely to span the full range of the signal transition region ($t_{AJ}$) 904, since it is unlikely that a minimum possible signal transition time and a maximum possible transition time occurs during a single symbol transition. In one example, the signal transition region 904 may be bounded by the time of the first zero crossing 910 detected at the output of a differential receiver 802a, 802b, or 802c and the time of the last zero crossing 912 detected at the output of a differential receiver 802a, 802b, or 802c, for all possible symbol transitions. The transition times observed at the outputs of the differential receiver 802a, 802b, and 802c correspond to the times taken for the connectors and/or wires 810a, 810b, or 810c to reach a next state after the input to a driver (e.g., driver 308 in FIG. 3) of the connector and/or wire 810a, 810b, or 810c. The longest possible transition time may be determined based on the characteristics of the connector and/or wire 810a, 810b or 810c and the type of state transition involved. In one example, the longest possible transition time may be determined by the rise or fall time of a signal. Rise and fall times may be determined by the nature and voltage levels of the original and/or the final states. Typically, the longest possible transition time corresponds to a transition between an actively driven state and an undriven state.

A high value of $t_{AJ}$ for the transition region 904 can result in increased design difficulty associated with the CDR circuit 424 or clock generation circuit 806. For example, clock generation circuit 806 may employ a delay element or timer that is triggered by the first zero crossing of the three differential receiver outputs 802a, 802b and 802c. The state of the outputs of all three differential receivers 802a, 802b and 802c may not be safely sampled until all of the differential receivers 802a, 802b and 802c have reached their final state, which may be defined by the eye opening 906. Accordingly, the delay element or timer may be triggered at the start 910 or estimated start of the transition region 904, and ideally the timer expires shortly after the end 912 of the transition region 904, at which time clock generation circuit 706 may output a clock edge that is used to sample the outputs of the three differential receivers 802a, 802b and 802c.

In some systems, delay elements in the CDR circuit 424 can be afflicted by variations in manufacturing process, circuit supply voltage, and die temperature (PVT variation), and may generate delays that vary significantly. In such systems, the nominal operating condition of the CDR circuit 424 is generally set by design to generate a clock edge somewhere in the middle of the eye opening 906 in order to ensure that a clock edge occurs after the end 912 of the transition region 904 and prior to the commencement 914 of the transition region to the next symbol, even under worst case PVT effects. Difficulty can arise in designing a CDR circuit 424 that guarantees a clock edge within the eye opening 906 when the transition region 904 is large compared to the eye opening 906. For example, a typical delay element may produce a delay value that changes by a factor of 2 over all PVT conditions, and the eye opening 906 must be larger than the transition region 904 in order that a non-adjustable delay value can be chosen. According to certain aspects described herein, a dynamically configured delay may account for operational variations in the performance of the delay circuit.

Variability in the rise and fall times of signals on a multi-wire interface and differences in performance of receivers monitoring the signals may result in a transition region 904 (see FIG. 9) during which multiple detections of the symbol transition may be produced. A CDR circuit 424 (see FIG. 4) may be configured to delay generation of a sample clock until after all possible transition detections have occurred. In one example, the CDR circuit may initiate a delay after the first detection of a symbol transition and may ignore or suppress further transitions during the delay period. The duration of the delay period can impact the maximum symbol transmission rate and can degrade performance if the delay period is unnecessarily long.

According to certain aspects described herein, a training sequence or preamble may be provided that allows the delay period to be calibrated to an observed transition region 904. That is, the preamble may be used to determine the maximum variability between transition detections for various signaling state changes on different combinations of wires. A delay period calculated based the maximum variability of transition timing may be used to produce an optimal clock mask that can be used to suppress additional transitions occurring in the transition region 904. A preamble may be transmitted before each data transmission to enable dynamic recalibration of the clock mask, thereby accounting for variations caused by changes in PVT conditions during normal operation.

It is noted that to calibrate a receiver, it is convenient to receive a high-speed signal to be able to properly adjust the delay circuits in the receiver clock recovery function. However, it is difficult to properly receive the high-speed signal and use it for delay calibration when the delays in the high-speed clock recovery circuits have not been calibrated. Thus, the presently disclosed methods and apparatus provide for transmission of a calibration sequence that consists of symbols having only a single transition at each symbol boundary. In particular, the presently disclosed methods and apparatus may utilize single transitions in a preamble sent from a transmitter (e.g., 300 in FIG. 3), which helps improve reliability at the receiver (e.g., apparatus 400 in FIG. 4). In the context of the apparatus of FIGS. 2-4, as an example, the presently disclosed methods and apparatus afford improved reliability of the transmission of information at a maximum symbol rate from the transmitter (e.g., physical layer drivers 210 and/or apparatus 300) over a communication link (e.g., link 220 in FIG. 2 or 310a, 310b, 310c in FIG. 3 and corresponding 412a, 412b, and 412c in FIG. 4) to a corresponding receiver (e.g., physical layer drivers 240 and/or apparatus 400) before the receiver has had an opportunity to calibrate its clock recovery circuit. Sending symbol sequences with single transition symbols in the preamble sequence generated at the transmitter do not require a calibrated clock recovery circuit for reliable reception of these symbol sequences. This property provides for reliable calibration so that multiple edges at each symbol or unit interval boundary do not cause ambiguity for the calibration algorithm performed in the receiver.

Depending upon the implementation of the receiver clock recovery calibration circuitry (e.g., CDR 424), it may be useful to receive a longer sequence of single-transition symbols than are normally needed in a standard preamble, such as a C-PHY preamble, in order to have sufficient time to perform the calibration. Although the preamble length is adjustable, the system performance may be better if the preamble is kept as short as possible. Moreover, if the preamble is used for calibration, but the calibration circuit needs a longer preamble, it becomes difficult to coordinate between the transmitter and receiver when the preamble will be transmitted with a sufficient duration to perform receiver calibration versus transmitting a minimal standard length preamble to be used to transmit a data burst.

Accordingly, the present methods and apparatus further include defining different preamble sequences for each type of burst. The receiver can determine whether calibration was intended by detecting the symbol values that make up the preamble. A standard preamble having a value of all "3" symbols is used to transmit a normal data burst, as currently defined in the C-PHY specification as an example. A different preamble consisting of all "1" symbols, for example, could be defined to also precede a data burst, but to also indicate that this preamble is longer than normal and can safely be used for calibration of the clock recovery circuit. An un-calibrated receiver could reliably receive either type of preamble because both consist solely of single-transition symbols.

Figure 10:
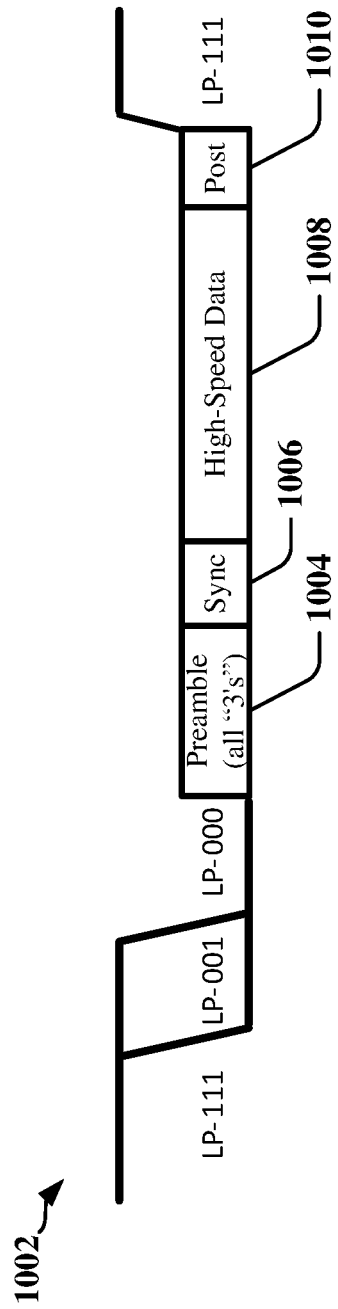
FIG. 10 illustrates an example of a standard or "normal" preamble construction in a sequence of symbols.

FIG. 10 illustrates an example of a standard or "normal" preamble construction in a sequence of symbols for the sake of illustrating a reference or typically constructed preamble in a high speed sequence. In a particular example, the preamble construction may be one specified by the MIPI specification for C-PHY interfaces. As shown, sequence 1002 is a data burst including a preamble 1004 constructed or configured according to a predefined or "normal" preamble length, such as a standard length defined by the MIPI C-PHY standard. As illustrated, after low-power lane states LP-111 (i.e., a low power stop state), LP-001 (i.e., a High Speed request state), and LP-000 (i.e., Bridge state to High Speed), at the start of high speed transmission, a preamble 1004 in the sequence 1002 consists of symbols having the same value, such as all "3's". After the preamble 1004, the sequence 1002 may include synchronization symbols 1006 transmitted prior to the high-speed forward payload data burst 1008. The sequence 1002 concludes with a post group of symbols 1010 signifying the end of the particular sequence.

Figure 11:
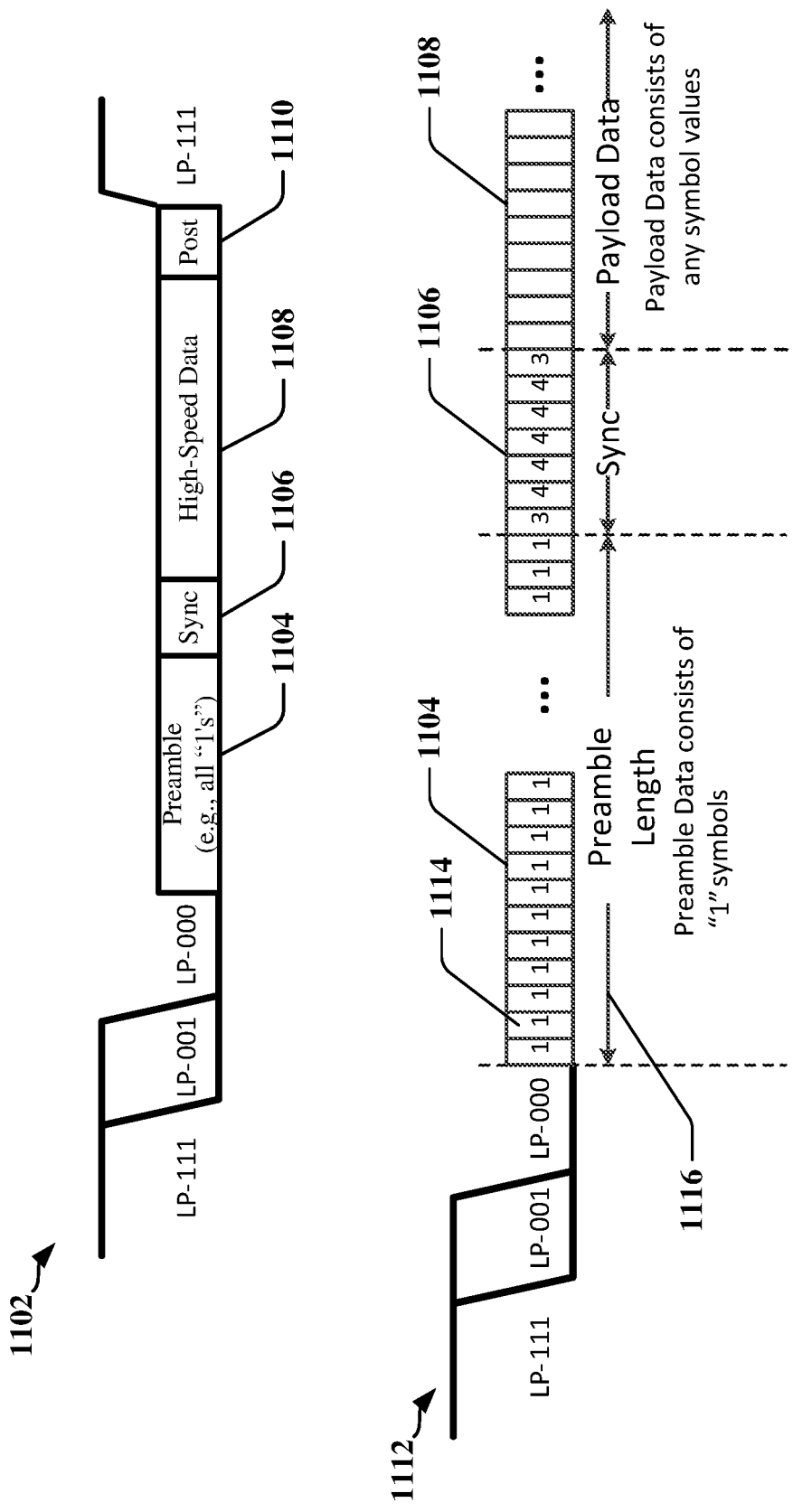
FIG. 11 illustrates an example of a sequence format for a sequence of symbols using a calibration preamble according to the present disclosure.

According to an aspect of the present disclosure, FIG. 11 illustrates an example of a sequence format 1102 for a sequence of symbols in accordance with the presently disclosed methods and apparatus. In the example of FIG. 11, sequence 1102 is configured differently from the "normal"

or typical sequence illustrated in FIG. 10. In particular, the sequence 1102 includes a calibration preamble 1104 that is configured as a sequence of a number of single transition symbols having a same value, such as a preamble consisting of all "1" symbols (e.g., a flip of 0, a rotation of 0, and a polarity of 1). Similar to the sequence format 1002, sequence format 1102 includes synchronization symbols 1106 transmitted prior to the high-speed forward payload data burst 1108. The sequence 1102 concludes with a post group of symbols 1110 signifying the end of the particular sequence.

FIG. 11 further illustrates a more detailed illustration 1112 of the sequence 1102 showing the preamble 1104 having a sequence of "1" symbols 1114 in the preamble. The preamble 1104 has a particular preamble length 1116. In a further aspect, a transmitter may be configured to be able to control the length of the preamble 1104 in predetermined increments or groups of symbol unit intervals. In another aspect, the preamble length 1116 may also be adjustable in the transmitter. For example, it is noted that the duration in the number of symbols for preamble (i.e., 1104) can be programmable in the transmitter (e.g., wire/connector state encoder 306 shown in FIG. 3) to accommodate the needs of the specific receiver used with the transmitter.

In still another aspect, the preamble 1104 consisting of all single transition "1" symbols can also be configured to indicate that this preamble is longer than the "normal" preamble (e.g., preamble 1004 shown in FIG. 10) and that this longer preamble may be safely be used for calibration of the clock recovery circuit in a receiver. In an example, in order to effectuate this indication of longer preamble length, a receiver may be configured to know a priori that when the particular calibration preamble 1104 is received, the receiver will be signaled through the predefined knowledge that the preamble 1104 will be longer. As described before, an un-calibrated receiver can reliably receive this type of preamble because it consists solely of single-transition symbols.

According to another example, the sequence 1102 may further include some alternate or additional sequence of symbols (not shown in FIG. 11) that occurs in the sequence 1102 within the calibration preamble 1104 data, but before the sync and data burst fields 1106, 1108. The alternate or additional field may include further data for use by a receiver. Furthermore, the alternate sequence may be mapped and encoded data, and may comprise a pseudorandom binary sequence in one example, but is not limited to such. It is further noted that the mapped and encoded data in the alternate sequence may consist of symbols 0 through 4, and are not necessarily limited to only 1 and 3 symbols (i.e., the alternate sequence is not limited to single state transition symbols, but may also include double and triple state transition symbols as well). As with the preamble length 1116, the length the alternate sequence of symbols may also be adjustable in the transmitter or determined a priori.

In another example, it is also possible for a receiver (e.g., receiver 400 in FIG. 4) to perform calibration using the standard preamble consisting of all "3" symbols (rather than all "1's" as shown in the example 1102) if that receiver's calibration circuit is able to finish performing the calibration algorithm within the duration of the standard preamble. In that case, the sequence 1102 would not be used in lieu of simply using the sequence 1002 shown in FIG. 10. In this case, this would allow the receiver to calibrate the delay circuit on every burst, which can simplify the design of the transmitter hardware and/or software, so that it does not need to determine when it is appropriate for receiver calibration to occur.

Figure 12:
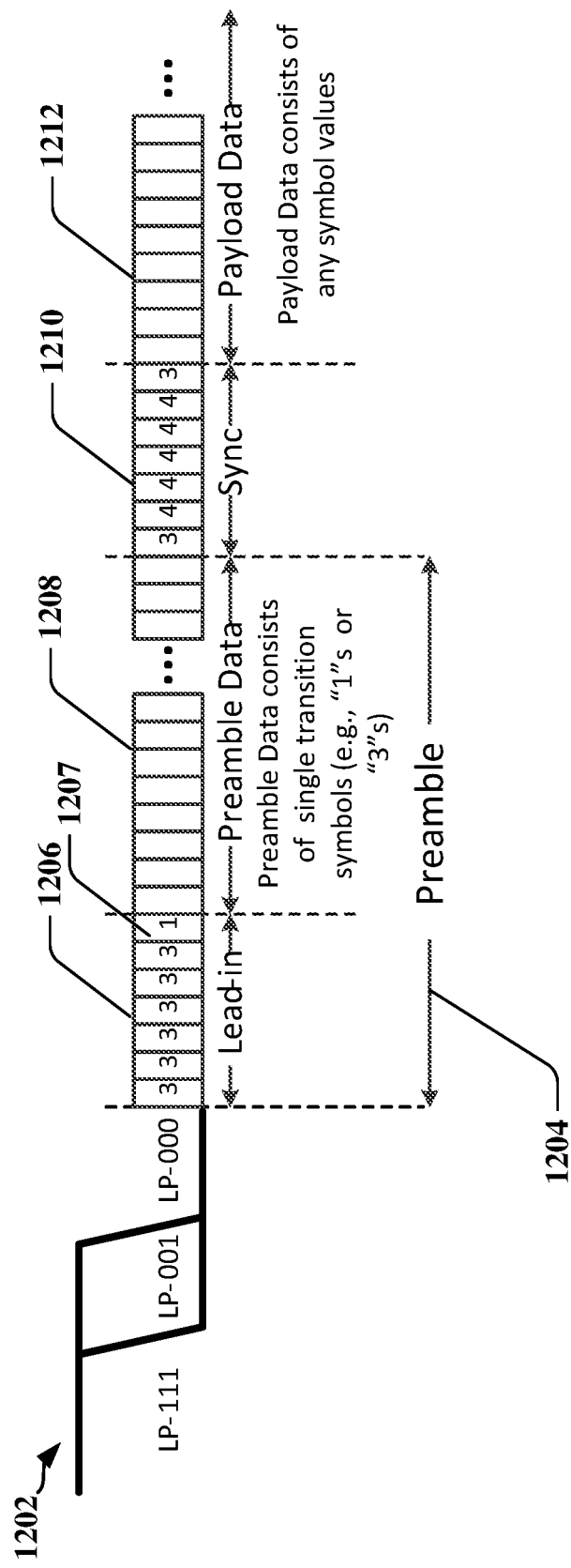
FIG. 12 illustrates a further example of a sequence format for a sequence of symbols using a calibration preamble according to the present disclosure.

FIG. 12 also illustrates another exemplary sequence 1202 utilizing a preamble containing arbitrary data that can be reliably received by an un-calibrated receiver. In this example, the sequence 1202 includes a preamble 1204 including a lead-in sequence 1206, which may also be constructed of single transition symbols. The lead-in sequence 1206 serves to provide recovered clock pulses at the beginning of the preamble 1204 while the drivers in the transmitter (e.g., 308) and the differential receiver circuits (e.g., 402, 404, 424 in FIG. 4) in the receiver module (e.g., 400) are powering up. There may also be a symbol transition 1207 (i.e., transition from a "3" to a "1" symbol) at the end of the Lead-in 1206 that provides message-level synchronization so that the receiver will know the start of the preamble data 1208. In an example of a 3-Phase system, the preamble data 1208 in preamble 1204 may consists solely of "1" and "3" symbols, which are all single-transition symbols. These symbol values can map arbitrarily to 0 and 1 binary values or a defined by a user to map to predefined values, so that each symbol of preamble 1204 encodes a single bit of information. The receiver captures the preamble data, which can be used for many different purposes in the system that may benefit the operation of the receiver or the higher-level system. This exemplary sequence 1208 therefore provides a convenient means to provide data to the receiving subsystem to establish operations such as the receiver operating mode, power states, or any low-level mode indicator. The data for establishing the receiver operating mode may include a command for the receiver to perform calibration. According to yet a further aspect, the preamble data 1208 and preferably symbols occurring earlier in the preamble data sequence 1208 (i.e., at least portion of the preamble), can also be configured to indicate whether the preamble 1204 has sufficient length to allow a receiver to perform calibration of the delays in the receiver clock recovery circuit (e.g., CDR 424). Of further note, this indication of the length sufficiency may also be accomplished by the preamble 1104 in the example of FIG. 11.

It is further noted that the examples of in FIGS. 11 and 12 are merely illustrative of a particular 3-phase system, and those skill in the art will appreciate other preambles may be selected for other N-Phase systems. Notwithstanding, the preambles for other systems would still feature the use of single transition symbols in order to improve reliability according to the concepts disclosed herein.

Additionally, the concepts herein can also be extended beyond the choice of one of two types of preamble having either "1's" or "3's" (e.g., 1004, 1104, 1204). In particular, it is further possible to reliably transmit data of any nature to an un-calibrated receiver by using arbitrary sequences of single transition symbols. In a 3-Phase system, for example, this would be through the use of sequences of the single transition "1" and "3" symbols. For N-Phase systems where N>3, there are more single-transition symbols that are possible, with more arbitrary sequences of single transition symbols.

Figure 13:
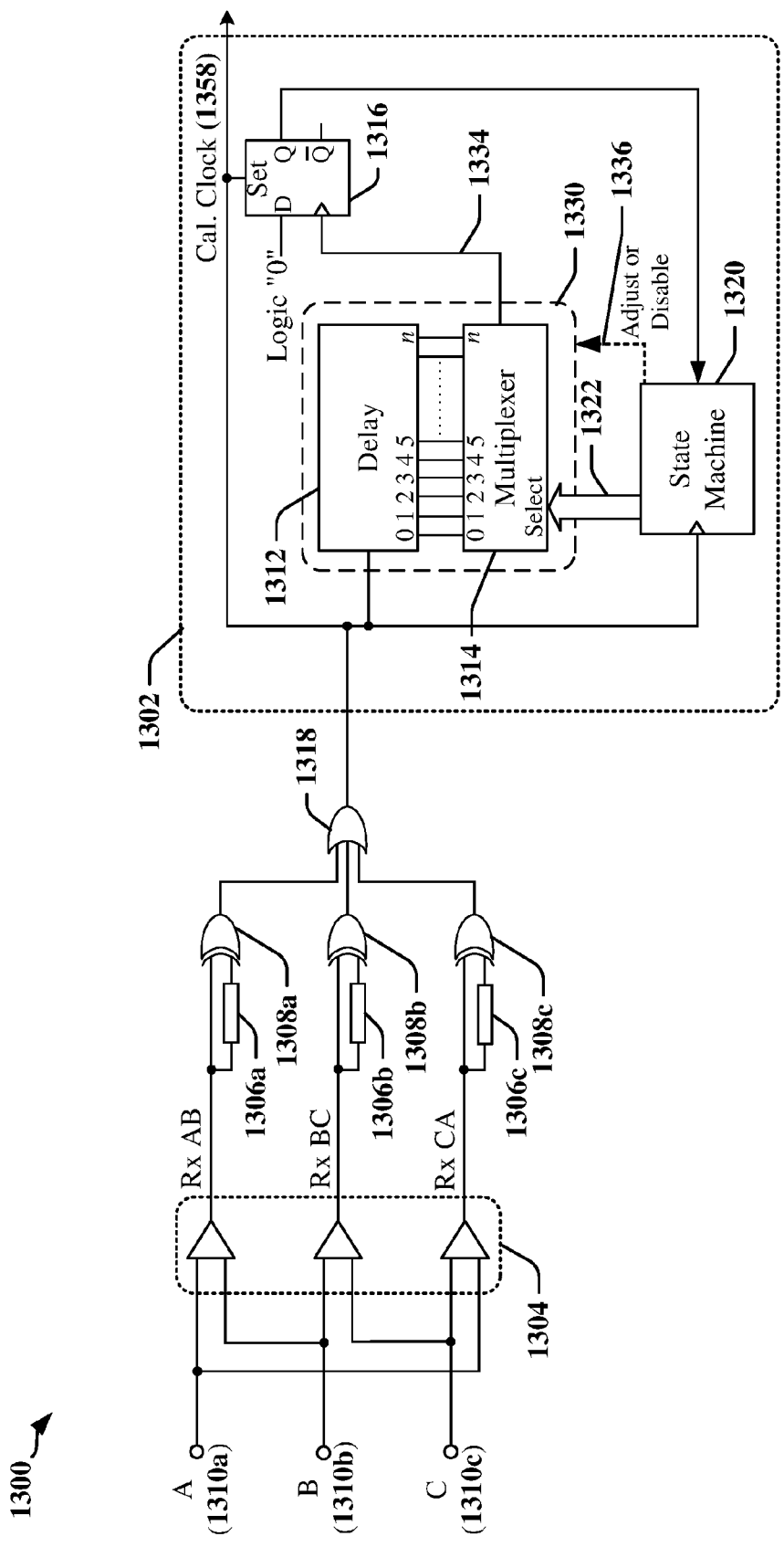
FIG. 13 is a simplified block diagram illustrating a calibration circuit used in an N-phase polarity decoder.

FIG. 13 is a block diagram 1300 illustrating a simplified calibration circuit 1302 that can be used to generate a calibration clock 1358 at a receiver. The calibration clock 1358 may be derived from transitions on one or more outputs of the three differential receivers 1304. The calibration circuit 1302 may be clocked by the calibration clock

1358. A calibration sequence in the received preamble (e.g., preamble 1104 in FIG. 11) may be configured with single transition symbols.

In the illustrated 3-wire, 3-phase example, a state machine 1320 controls the operation of the calibration circuit 1302. Another type of controller or processing circuit may be used as desired or indicated by the application, including for example a processing circuit that employs a sequencer, an embedded processor, a digital signal processor and/or some other processing device. Signals representative of the electrical condition of the transmission lines are received at the inputs 1310a, 1310b and 1310c, and the signals are provided to the differential receivers 1304, which provide outputs that may represent the results of comparisons of all combinations of pairs of the inputs 1310a, 1310b and 1310c. Exclusive OR gates (XORs) 1308a, 1308b and 1308c compare the output of each of the differential receivers 1304 with a delayed version of the output the respective differential receiver 1304. The delayed version may be produced using delay elements 1306a, 1306b and 1306c. The outputs of the XORs 1308a, 1308b and 1308c provide pulsed signals where the widths of the pulses have a duration or width corresponding to the delay introduced by the respective delay elements 1306a, 1306b and 1306c. An OR gate 1318 combines the outputs of the XORs 1308a, 1308b and 1308c to generate the calibration clock signal 1358, which includes all pulses corresponding to transitions detected for any pair of inputs 1302.

The calibration clock signal 1358 is provided to a programmable delay element 1330 that includes a clocked delay line 1312 and a multiplexer 1314. The time taken for a pulse on the calibration clock signal 1358 to pass through the delay element 1330 is determined by the value of the select input 1322 provided by the state machine 1320. Each pulse on the calibration clock signal 1358 activates the "set" input of a flip-flop that may be implemented using a "D" register 1316. The D register 1316 is reset when a first pulse in a delayed version 1334 of the calibration clock signal 1358 exits the delay element 1330. In the example, the multiplexer 1314 selects one of n progressively delayed outputs (delay taps) of the delay line 1312 as an output of the delay element 1330. The tap is selected by an input value 1322 controlled by the state machine 1320.

The state machine 1320 may be configured to determine a suitable delay value by conducting a search based on a successive approximation algorithm, a linear search algorithm, or another suitable search algorithm. The state machine 1320 may be configured to find the delay tap that approximates a delay interval corresponding to one symbol period, which may be expressed as the transmission clock frequency. A clock generator circuit 806 (see FIG. 8) may use this same delay interval to control the frequency of the receive clock and to determine when data is to be sampled. In one example, the clock generator circuit 806 may determine a sample point by subtracting an amount of delay from the symbol time so that the delay is safely contained within one symbol period.

A clock mask can be produced based on the receive clock period and a sampling delay, where the clock mask ensures data is sampled when signals at the inputs of the decoder 412a, 412b and 412c have stabilized. Stability of the input signals can be assured regardless of PVT variations by calibrating the clock generator circuit 806 for every transmission. In this manner limitations on maximum speed of the circuit attributable to PVT variations of the clock mask delay can be alleviated.

In one example, the state machine 1320 may set the multiplexer select input 1322 to a relatively large value to detect the first pulse indicating a transition. In one example, the multiplexer select input 1322 may be set to a value lying in the middle of the range of possible values. For each subsequent pulse, the state machine 1320 may reduce or increase the multiplexer select input value 1322 until the period of the transmission clock is determined. The state machine 1320 may increase or decrease the select input 1320 by an increment that is halved for each subsequent change in select input value 1322. The period of the transmission clock may be determined when the first pulse associated with a transition exits the delay element 1330 after the last pulse associated with the same transition for every transition.

In practice, a pulse exiting the delay element 1330 clears the D register 1316 while a pulse in a delayed version 1334 of the calibration clock signal 1358 sets the D register 1316. The state machine 1320 monitors the output of the D register 1316 and may increase or "back off" the delay value as needed to obtain an optimized delay value. The state machine 1320 also monitors and responds to pulses in the calibration clock signal 1358 indicating a transition detected on a pair of the inputs 1302. In one example, the state machine is clocked by the calibration clock signal 1358. The state machine 1320 may be further adapted or configured to enable measurement of the transmission clock from the preamble 1302.

In yet another aspect, the state machine 1320 may also be configured to adjust or disable the delay element 1330 as conceptually shown by optional signal 1336. In a particular aspect, the delay may be adjusted and adjusted delay may then be compared with the arrival of the next symbol boundary. When the delay has been determined with sufficient accuracy then some fraction of that delay value may be used as the mask value to ignore multiple transitions after the first edge in each group of transitions.

Figure 14:
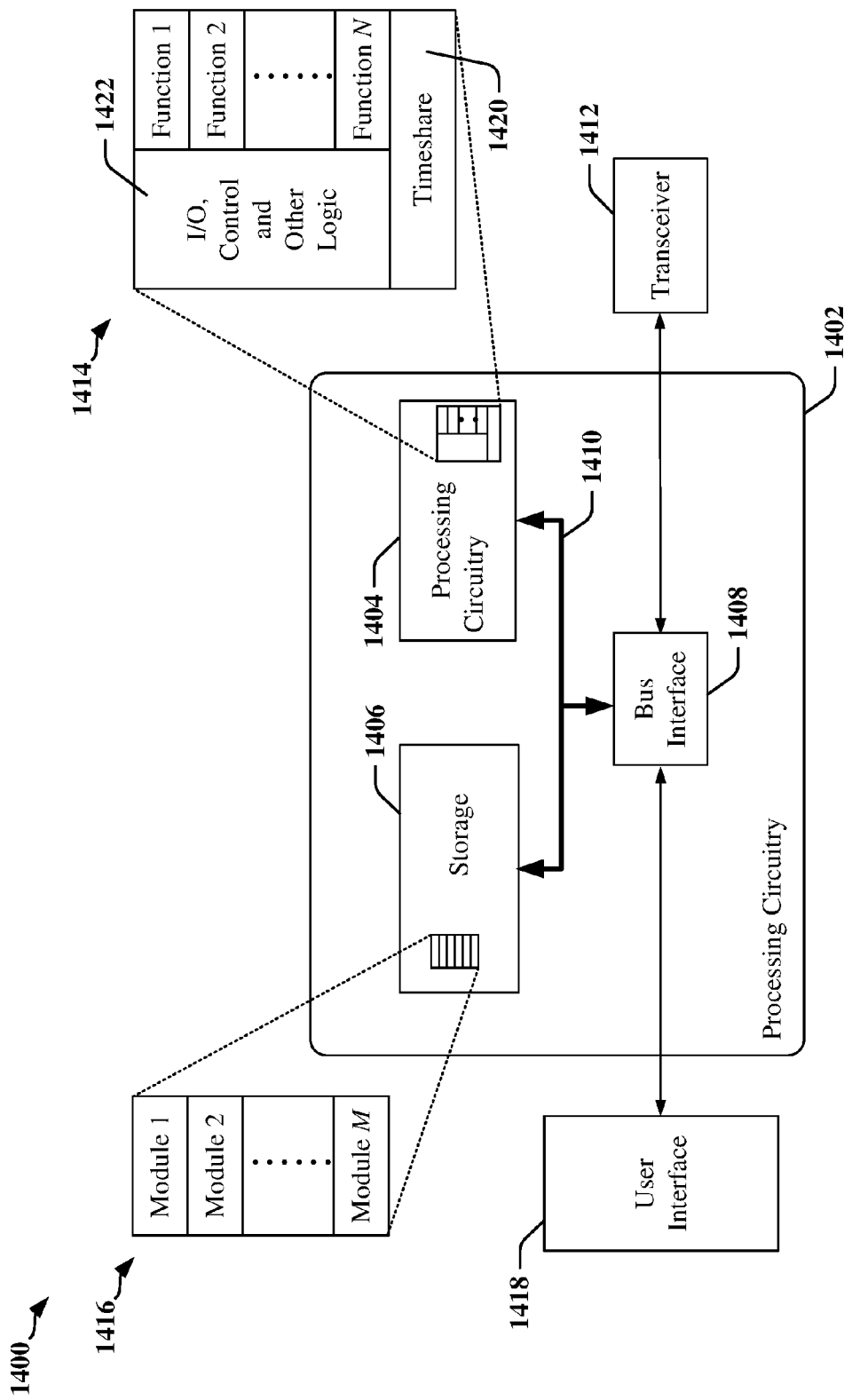
FIG. 14 is a block diagram illustrating an example of an apparatus employing a processing system that may be adapted according to certain aspects disclosed herein.

FIG. 14 is a conceptual diagram 1400 illustrating a simplified example of a hardware implementation for an apparatus employing a processing circuit 1402 that may be configured to perform one or more functions disclosed herein. In accordance with various aspects of the disclosure, an element, or any portion of an element, or any combination of elements as disclosed herein for three phase preamble construction may be implemented using the processing circuit 1402. The processing circuit 1402 may include one or more processors 1404 that are controlled by some combination of hardware and software modules. Examples of processors 1404 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1404 may include specialized processors that perform specific functions, and that may be configured, augmented or controlled by one of the software modules 1416. For example, the processing circuit may be configured as channel processors, frame processors and other processors that are adapted to handle encoding and decoding of data for transmission on one or more wireless networks. The one or more processors 1404 may be configured through a combination of software modules 1416 loaded during initialization, and further configured by loading or unloading one or more software modules 1416 during operation.

In the illustrated example, the processing circuit 1402 may be implemented with a bus architecture, represented generally by the bus 1410. The bus 1410 may include any number of interconnecting buses and bridges depending on the specific application of the processing circuitry 1402 and the overall design constraints. The bus 1410 links together various circuits including the one or more processors 1404, and storage 1406. Storage 1406 may include memory devices and mass storage devices, and may be referred to herein as computer-readable media. The bus 1410 may also link various other circuits such as timing sources, timers, peripherals, voltage regulators, and power management circuits. A bus interface 1408 may provide an interface between the bus 1410 and a transceiver 1412. The transceiver 1412 provides a means for communicating with various other apparatus over a transmission medium. Depending upon the nature of the apparatus, a user interface or other device 1418 (e.g., keypad, display, speaker, microphone, joystick, camera, etc.) may also be provided, and may be communicatively coupled to the bus 1410 directly or through a bus interface 1408. Additionally, the bus 1410 and/or the bus interface 1408 may be instead configured as a MIPI interface, such as a physical C-PHY interface, and may operate according to the concepts disclosed herein.

A processor 1404, such as an application processor, may be responsible for managing the bus 1410 and for general processing that may include the execution of software stored in a computer-readable medium that may include the storage 1406. In this respect, the processing circuit 1402, including the processor 1404, may be used to implement any of the methods, functions and techniques disclosed herein. The storage 1406 may be used for storing data that is manipulated by the processor 1404 when executing software, and the software may be configured to implement any one of the methods disclosed herein.

One or more processors 1404 in the processing circuitry 1402 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1406 or in an external computer readable medium. The computer-readable medium and/or storage 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1406 may also include, by way of example, a carrier wave, a transmission line, and any other suitable medium for transmitting software and/or instructions that may be accessed and read by a computer. Computer-readable medium and/or the storage 1406 may reside in the processing circuit 1402, in the processor 1404, external to the processing circuit 1402, or be distributed across multiple entities including the processing circuit 1402. The computer-readable medium and/or storage 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1406 may maintain software maintained and/or organized in loadable code segments, modules, applications, programs, etc., which may be referred to herein as software modules 1416. Each of the software modules 1416 may include instructions and data that, when installed or loaded on the processing circuit 1402 and executed by the one or more processors 1404, contribute to a run-time image 1414 that controls the operation of the one or more processors 1404. When executed, certain instructions may cause the processing circuit 1402 to perform functions in accordance with certain methods, algorithms and processes described herein.

Some of the software modules 1416 may be loaded during initialization of the processing circuit 1402, and these software modules 1416 may configure the processing circuit 1402 to enable performance of the various functions disclosed herein. For example, some software modules 1416 may configure internal devices and/or logic circuits 1422 of the processor 1404, and may manage access to external devices such as the transceiver 1414, the bus interface 1408, the user interface 1418, timers, mathematical coprocessors, and so on. The software modules 1416 may include a control program and/or an operating system that interacts with interrupt handlers and device drivers, and that controls access to various resources provided by the processing circuit 1402. The resources may include memory, processing time, access to the transceiver, the user interface 1418, and so on.

One or more processors 1404 of the processing circuit 1402 may be multifunctional, whereby some of the software modules 1416 are loaded and configured to perform different functions or different instances of the same function. The one or more processors 1404 may additionally be adapted to manage background tasks initiated in response to inputs from the user interface 1418, the transceiver 1412, and device drivers, for example. To support the performance of multiple functions, the one or more processors 1404 may be configured to provide a multitasking environment, whereby each of a plurality of functions is implemented as a set of tasks serviced by the one or more processors 1404 as needed or desired. In one example, the multitasking environment may be implemented using a timesharing program 1420 that passes control of a processor 1404 between different tasks, whereby each task returns control of the one or more processors 1404 to the timesharing program 1420 upon completion of any outstanding operations and/or in response to an input such as an interrupt. When a task has control of the one or more processors 1404, the processing circuit is effectively specialized for the purposes addressed by the function associated with the controlling task. The timesharing program 1420 may include an operating system, a main loop that transfers control on a round-robin basis, a function that allocates control of the one or more processors 1404 in accordance with a prioritization of the functions, and/or an interrupt driven main loop that responds to external events by providing control of the one or more processors 1404 to a handling function.

Figure 15:
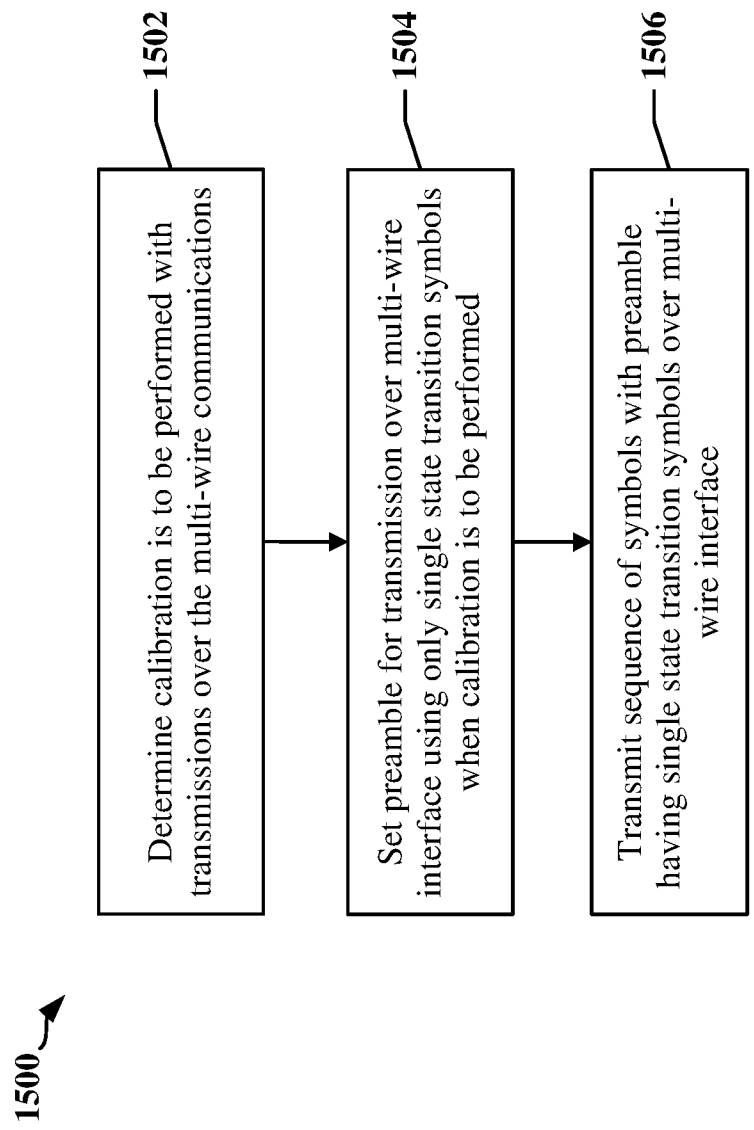
FIG. 15 is a flow chart of a method for communication over a multi-wire interface with a particular preamble construction.

FIG. 15 is a flowchart illustrating a method 1500 for communication in a multi-wire interface (e.g., an M-wire, N-phase communications link, such as link 220). The method includes determining when calibration is to be performed with transmissions over the multi-wire communications interface as shown at block 1502. This determination may be established a priori, such as when the multi-wire interface system is set up, such that the determination is pre-known or predefined. Nonetheless, it is also contemplated that in an alternative, the determination of a need for calibration may be determined periodically by a transmitter and/or receiver in the system (e.g., transmitter 300 in FIG. 3 and/or receiver 400 in FIG. 4).

After block 1502, method 1500 includes setting, constructing, assembling, determining, or configuring a preamble for transmission over the multi-wire interface using only single state transition symbols as indicated at block 1504. As discussed previously, a preamble with only single state transition symbols may be constructed or assembled at a transmitter, such as transmitter 300 in FIG. 3 in general, and more particularly with the state encoder 306 in other aspects. Additionally, it is noted that in some aspects, the symbols in the preamble may be all the same value of single transition symbols (e.g., all "3's" as shown in example 1100 in FIG. 11). Additionally, according to other aspects the preamble may be constructed with a mixture of different single transition symbols (See e.g., example 1200), but still consisting of only single transition symbols in the preamble.

After the setting of the preamble according to the process of block 1504, the calibration preamble is transmitted by a receiver (e.g., transmitter 300) in a sequence of symbols to a receiver (e.g. receiver 400) as shown in block 1506 when calibration is to be performed. The sequence of symbols may be transmitted over a multi-wire interface (i.e., an M-wire, N-phase interface), such as communication link 220 as depicted in FIG. 2. In particular examples, the interface is a 3-wire, 3-phase physical interface configured in accordance with the MIPI standards, such as MIPI C-PHY or D-PHY standards.

As also discussed before, one exemplary construction of a preamble may also include a lead-in sequence of symbols (e.g., 1206 in FIG. 12) before the preamble data (e.g., 1208 in FIG. 12) having a symbol value transition at the end of lead-in sequence, which is at least one symbol value that is different than the preceding symbol values in the lead-in sequence (e.g., symbol 1207 in FIG. 12 which is a transition from a "3" to a "1" symbol). This lead-in sequence serves to provide message-level synchronization so that the receiver will know the start of the preamble data.

In another aspect, the disclosed methodology includes adjusting the length of the preamble duration in a transmitter transmitting the preamble sequence. Additionally, the method 1500 may include configuring the preamble such that at least a portion of the preamble may indicate whether the preamble is of a length allowing for calibration of a delay in a receiver clock recovery circuit. In another aspect, the method 1500 may include transmitting an alternate sequence of symbols within the preamble to communicate further information to a receiver. As discussed before, the alternate sequence may comprise a pseudorandom binary sequence in an aspect.

Figure 16:
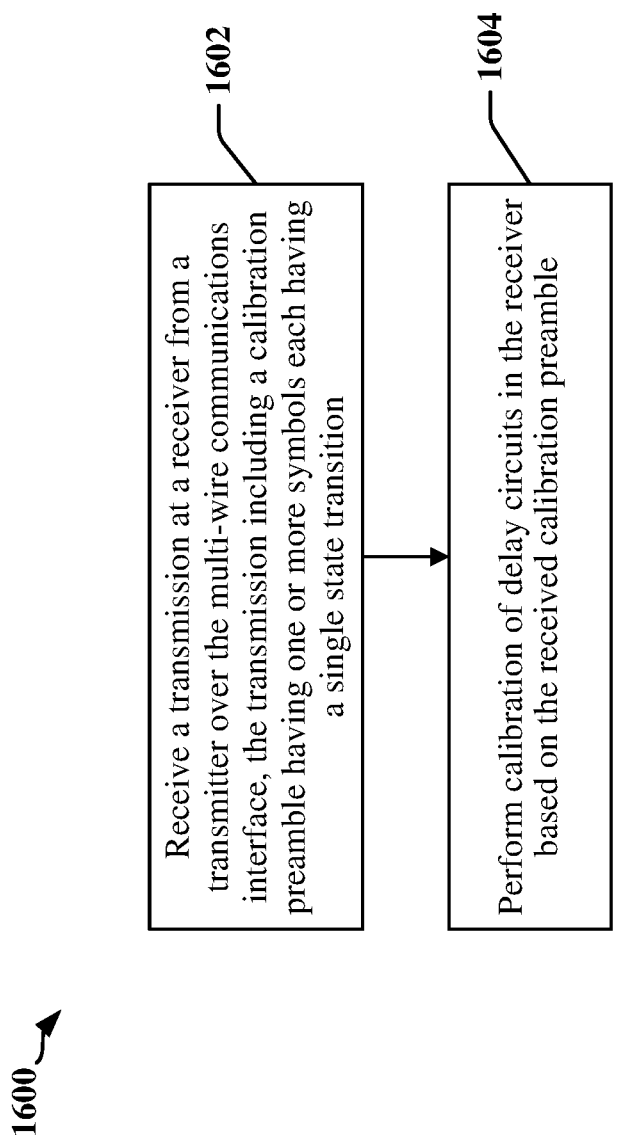
FIG. 16 is a flow chart of a method for communication over a multi-wire interface at a receiver configured to receive transmissions with a particular preamble construction.

FIG. 16 is a flowchart illustrating a method 1600 for communication at a receiver in a multi-wire interface system (e.g., an M-wire, N-phase communications link, such as link 220). The method 1600 includes receiving transmissions, such as a symbol sequence (See e.g., FIG. 11) over the multi-wire communications interface (e.g., 220) at a receiver (e.g., 400) from a transmitter (e.g., 300) as shown at block 1402, the transmission including a calibration preamble having one or more symbols each having a single state transition as shown at block 1602. The preamble may be configured according to any one of the examples in FIGS. 11 and 12, in an aspect. Furthermore, method 1600 may include performing calibration of delay circuits in the receiver (e.g., receiver 400 in FIG. 4) based on the received calibration preamble as illustrated in block 1604.

In further aspects, method 1600 also includes decoding the transmitted sequence as indicated at block where the decoding is based, in part, on the received preamble. Furthermore, method 1600 may also include determining one or more of an operating mode (including a command to perform calibration), a power state, and a low-level mode indicator for the receiver based on at least the preamble. In yet further aspects, method 1600 may include adjusting or disabling a delay element for a clock recovery circuit (e.g., programmable delay element 1330) in the receiver upon reception of the preamble.

In a further aspect, it is noted that the calibration of delay circuits in the receiver results in the adjustment of a delay that is configured to cause the receiver to ignore multiple transitions during a transition region (e.g., transition region 902 shown in FIG. 9). By ignoring multiple transitions after a first transition in a transition region the clock recovery circuit thus only generates a single pulse based on the first transition at the beginning of each symbol interval 902. Thus, in cases where the symbol results in more than one transition, the clock recovery circuit in a receiver can ignore subsequent second and third transitions, if they exist. Another feature of the calibration of delay circuits in the receiver is the ability to adjust the delay such that it is not longer than a minimum symbol interval. Still a further feature of adjusting the delay circuits in the receiver is the ability to adjust the delay such that it is not shorter than a maximum transition region. In an aspect, the minimum transition region may be time $t_{A,J}$ 904 illustrated in FIG. 9 or $t_{A,J}$ illustrated in examples 702, 704 or 708 of FIG. 7.

Of further note, the functions of methods 1500 and 1600 may be implemented through a number of the disclosed means herein. For example, the functions of blocks 1502, 1504, and 1506 may be implemented through means such as the transmitter 300 illustrated in FIG. 3, as well as processing circuitry 1404 in FIG. 14 or processing circuitry 1704 and preamble construction module/circuit 1710 in FIG. 17 to be discussed later. As another example, the functions of blocks 1602 and 1604 of method 1600 may be effectuated by means such as receiver 400 in FIG. 4 or the various components of receiver 1300 in FIG. 13, as well as delay calibration module/circuit 1808 in FIG. 18 to be discussed later herein.

Figure 17:
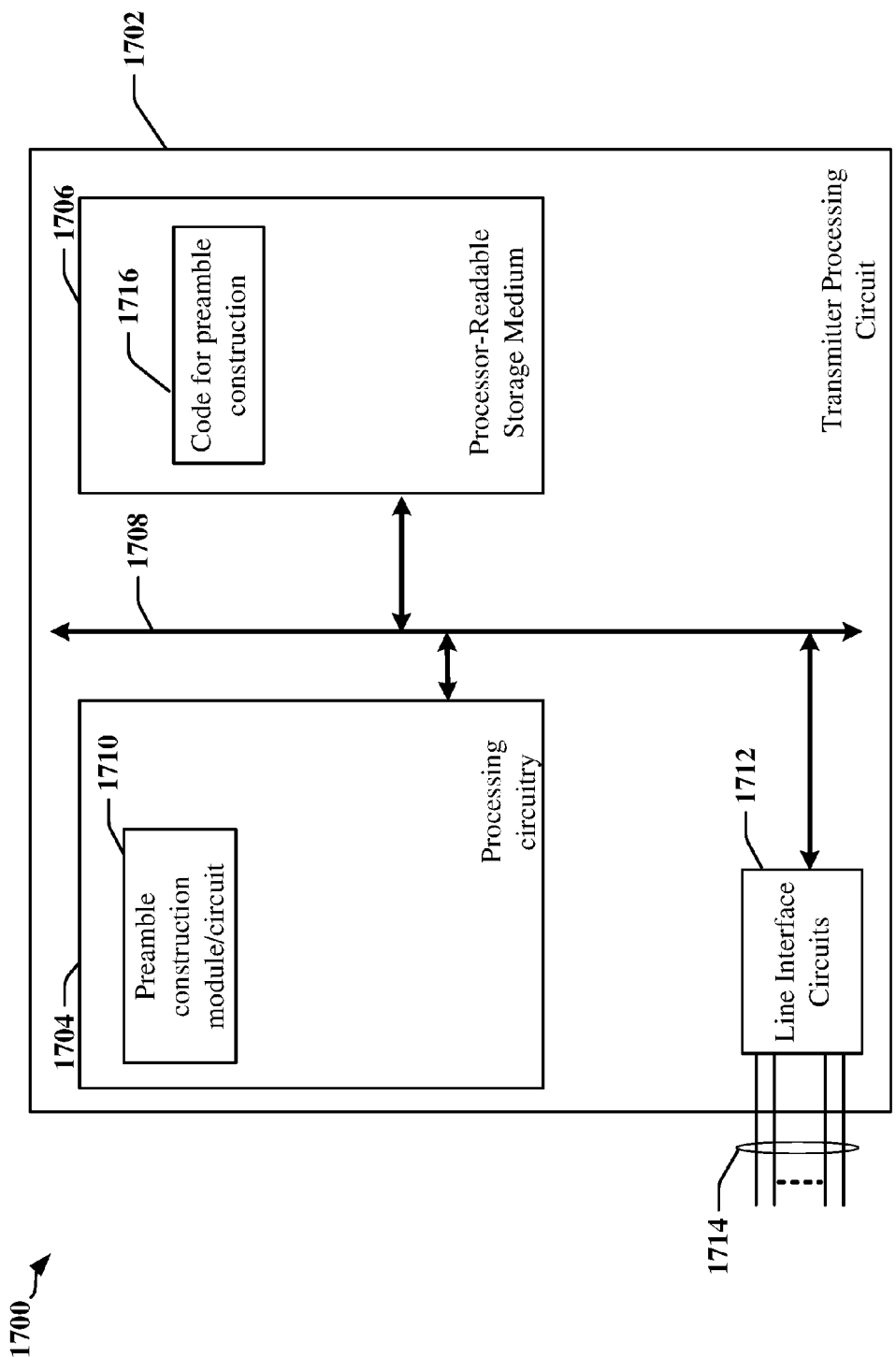
FIG. 17 is a diagram illustrating an example of a hardware implementation for an apparatus transmitting symbols over an M-wire, N-phase interface.

FIG. 17 is a diagram illustrating a simplified example of a hardware implementation 1700 for an apparatus employing a transmitter processing circuit 1702, which may include a sequencer or state machine. The processing circuit 1702 may be implemented with a bus architecture, represented generally by the bus 1708. The bus 1708 may include any number of interconnecting buses and bridges depending on the specific application of the processing circuit 1702 and the overall design constraints. The bus 1708 links together various circuits including one or more processors and/or hardware modules, line interface circuits 1712 configurable to communicate over connectors or wires 1714, and a computer-readable storage medium 1706. The bus 1708 may also link various other circuits such as timing sources, peripherals, voltage regulators, and power management circuits.

The processing circuitry 1704 may be responsible for general processing, including the execution of software stored on the computer-readable storage medium 1706. The software, when executed by the processing circuitry 1704, causes the processing circuit 1702 to perform the various functions described before for any particular apparatus. The software, when executed by the processing circuitry 1704, may cause the processing circuit 1702 to control logic and devices that are adapted to perform one or more of the various functions described earlier. The computer-readable storage medium 1706 may also be used for storing data that is manipulated by the processing circuitry 1704 when executing software.

The processing circuitry 1704 further includes module 1710 configured for constructing, assembling, configuring, and/or sequencing a preamble in accordance with the various preamble constructions disclosed herein. Module 1710 may be a software module running in the processing circuitry 1704, resident/stored in the computer readable storage medium 1706, as depicted with code 1716, one or more hardware modules coupled to the processing circuitry 1704 (not shown in FIG. 17), or some combination thereof. The module 1710 may include microcontroller instructions, state machine configuration parameters, or some combination thereof.

Figure 18:
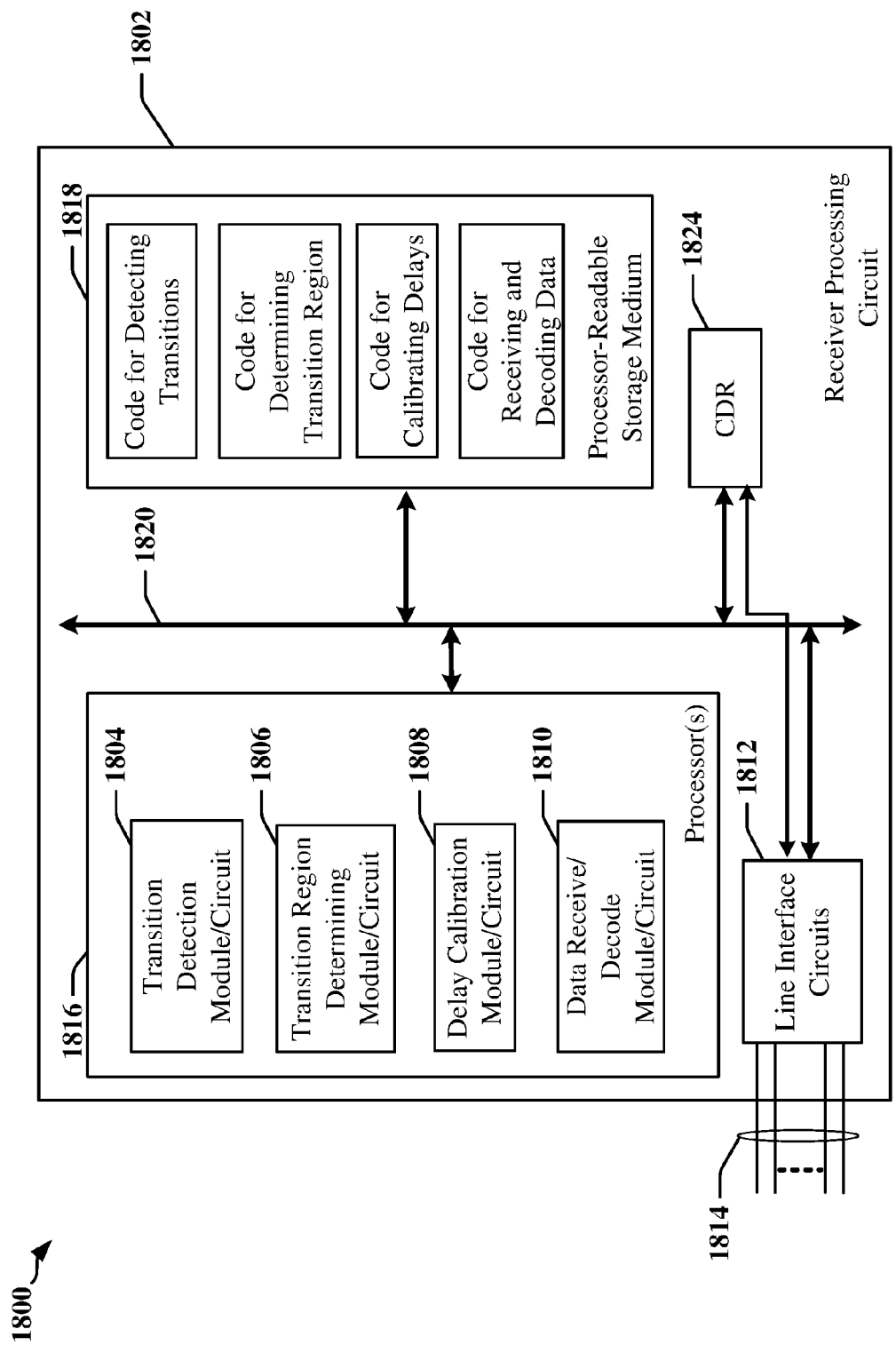
FIG. 18 is a diagram illustrating an example of a hardware implementation for an apparatus receiving symbols over an M-wire, N-phase interface.

FIG. 18 is a diagram illustrating a simplified example of a hardware implementation for an apparatus 1800 employing a processing circuit 1802, which may include a sequencer or state machine. The processing circuit 1802 may be implemented with a bus architecture, represented generally by the bus 1820. The bus 1820 may include any number of interconnecting buses and bridges depending on the specific application of the processing circuit 1802 and the overall design constraints. The bus 1820 links together various circuits including one or more processors and/or hardware modules, represented by the processor 1816, the modules or circuits 1804, 1806 and 1808, line interface circuits 1812 configurable to communicate over connectors or wires 1814 and the computer-readable storage medium 1818. The bus 1820 may also link various other circuits such as timing sources, peripherals, voltage regulators, and power management circuits. A CDR 1824 may be connected to the bus.

The processor 1816 is responsible for general processing, including the execution of software stored on the computer-readable storage medium 1818. The software, when executed by the processor 1816, causes the processing circuit 1802 to perform the various functions described supra for any particular apparatus. The software, when executed by the processor 1816, may cause the processing circuit 1802 to control logic and devices that are adapted to perform one or more of the various functions described earlier. The computer-readable storage medium 1818 may also be used for storing data that is manipulated by the processor 1816 when executing software. The processing circuit 1802 further includes at least one of the modules 1804, 1806, 1808, and 1810. The modules 1804, 1806, 1808, and 1810 may be software modules running in the processor 1816, resident/stored in the computer readable storage medium 1818, one or more hardware modules coupled to the processor 1816, or some combination thereof. The modules 1804, 1806, 1808, and 1810 may include microcontroller instructions, state machine configuration parameters, or some combination thereof.

In one configuration, the apparatus 1800 for wireless communication includes modules and/or circuits 1804, 1814 configured to detect a series of transitions in signaling state of three or more wires of a multi-wire communications interface 1814, a module and/or circuit 1824 that is configured to derive a receive clock from the series of transitions, modules and/or circuits 1806, 1814, 1824 configured to determine a transition region based on the series of transitions, a module and/or circuit 1808 that is configured to calibrate a delay period corresponding to a duration of the transition region, and modules and/or circuits 1810, 1824 configured to receive and/or decode data symbols from the multi-wire communications interface 1814 after termination of the preamble.

The aforementioned means may be implemented, for example, using some combination of a processing circuitry 206 or 236, physical layer drivers 210 or 240, communication link 220, and storage media 208 and 238.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for sending calibrating transmissions in a multi-wire communications interface comprising:
   determining when calibration is to be performed with transmissions over the multi-wire communications interface; and
   setting a preamble for at least one transmission over the multi-wire communications interface when calibration is to be performed, the preamble including one or more symbols each having a single state transition,
   wherein the preamble includes a lead-in sequence of symbols and a preamble data sequence, the lead-in sequence of symbols and the preamble data sequence configured as single state transition symbols, and
   wherein the lead-in sequence of symbols is operable for providing message-level synchronization usable by a receiver to detect start of the preamble data sequence.

2. The method of claim 1, further comprising:
   transmitting the preamble in a sequence of symbols over the multi-wire communications interface from a transmitter to the receiver.

3. The method of claim 1, wherein each of the one or more symbols having a single state transition in the preamble have a same symbol value.

4. The method of claim 1, wherein the preamble data sequence is configured to provide data to the receiver usable by the receiver to determine one or more of an operating mode, a power state, and a low-level mode indicator.

5. The method of claim 1, wherein a length of a preamble duration is adjustable in a transmitter transmitting the preamble.

6. The method of claim 1, further comprising:
transmitting an alternate sequence of symbols within the preamble to communicate further information to the receiver.

7. The method of claim 6, wherein the symbols in the alternate sequence include at least one of single transition symbols, double transition symbols, or triple transition symbols.

8. The method of claim 1, wherein at least a portion of the preamble is configured to indicate whether the preamble is of a length allowing for calibration of a delay in a receiver clock recovery circuit.

9. An apparatus for use in a multi-wire communications interface comprising:
at least one processing circuitry configured to:
determine when calibration is to be performed with transmissions over the multi-wire communications interface; and
set a preamble for at least one transmission over the multi-wire communications interface when calibration is to be performed, the preamble including one or more symbols each having a single state transition, wherein the preamble includes a lead-in sequence of symbols and a preamble data sequence, the lead-in sequence of symbols and the preamble data sequence configured as single state transition symbols, and wherein the lead-in sequence of symbols is operable for providing message-level synchronization usable by a receiver to detect start of the preamble data sequence; and
a memory coupled to the at least one processing circuitry.

10. The apparatus of claim 9, wherein the at least one processing circuitry is further configured to transmit the preamble in a sequence of symbols over the multi-wire communications interface from a transmitter to the receiver.

11. The apparatus of claim 9, wherein each of the one or more symbols having a single state transition in the preamble have a same symbol value.

12. The apparatus of claim 9, wherein the preamble data sequence is configured to provide data to the receiver usable by the receiver to determine one or more of an operating mode, a power state, and a low-level mode indicator.

13. The apparatus of claim 9, wherein the at least one processing circuitry is further configured to adjust a length of a preamble duration.

14. The apparatus of claim 9, wherein the at least one processing circuitry is further configured to transmit an alternate sequence of symbols within the preamble to communicate further information to the receiver.

15. The apparatus of claim 14, wherein the symbols in the alternate sequence include at least one of single state transition symbols, double state transition symbols, or triple state transition symbols.

16. The apparatus of claim 9, wherein the at least one processing circuitry is further configured to set at least a portion of the preamble to be configured to indicate whether the preamble is of a length allowing for calibration of a delay in a receiver clock recovery circuit.

17. A non-transitory processor-readable storage medium having one or more instructions which, when executed by at least one processing circuitry, cause the at least one processing circuitry to:
determine when calibration is to be performed with transmission over a multi-wire communications interface; and
set a preamble for at least one transmission over the multi-wire communications interface when calibration is to be performed, the preamble including one or more symbols each having a single state transition, when the preamble includes a lead-in sequence of symbols and preamble data sequence, the lead-in sequence of symbols and the preamble data sequence configured as single state transition symbols, and wherein the lead-in sequence of symbols is operable for providing message-kevel synchronization usable by a receiver to detect start of preamble data sequence.

18. The non-transitory processor-readable storage medium of claim 17, wherein the one or more instructions which, when executed by the at least one processing circuitry, further cause the at least one processing circuitry to:
transmit the preamble in a sequence of symbols over the multi-wire communications interface from a transmitter to the receiver.

19. The non-transitory processor-readable storage medium of claim 17, wherein each of the one or more symbols having as single state transition in the preamble have a same symbol value.

20. The non-transitory processor-readable storage medium of claim 17, wherein the preamble data sequence is configured to provide data to the receiver usable by the receiver to determine on or more of an operating mode, a power state, a low-level mode indicator.

21. The non-transitory processor-readable storage medium of claim 17, wherein the one or more instructions which, when executed by the at least one processing circuitry, further cause the at least one processing circuitry to transmit an alternate sequence of symbols within the preamble to communicate further information to the receiver.

22. A method for receiving transmissions in a multi-wire communications interface comprising:
receiving a transmission at a receiver from a transmitter over the multi-wire communications interface, the transmission including a calibration preamble having one or more symbols each having a single state transition, wherein the calibration preamble includes a lead-in sequence of symbols and a preamble data sequence, the lead-in sequence of symbols and the preamble data sequence configured as single state transition symbols, and wherein the lead-in sequence of symbols is operable for providing message-level synchronization usable by the receiver to detect start of the preamble data sequence; and
performing calibration of delay circuits in the receiver based on the received calibration preamble.

23. The method of claim 22, further comprising:
determining one or more of an operating mode, a power state, and a low-level mode indicator for the receiver based on at least the calibration preamble.

24. The method of claim 22, further comprising:
adjusting a delay element for a clock recovery circuit in the receiver upon reception of the calibration preamble.

25. The method of claim 22, wherein the calibration of delay circuits in the receiver results in adjustment of a delay that is configured to cause the receiver to ignore multiple transitions during a transition region.

26. The method of claim 22 wherein the calibration of delay circuits in the receiver results in adjustment of a delay that is not longer than a minimum symbol interval.

27. The method of claim 22, wherein the calibration of delay circuits in the receiver results in adjustment of a delay that is not shorter than a maximum transition region.

* * * * *